US012710715B2

(12) United States Patent
Takagi

(10) Patent No.: US 12,710,715 B2
(45) Date of Patent: Aug. 18, 2026

(54) IMAGE FORMING APPARATUS WITH FIXING VIA ROTARY HEATER AND BONDING VIA HEATER CONFIGURED TO MOVE IN THICKNESS DIRECTION

(71) Applicant: CANON KABUSHIKI KAISHA, Tokyo (JP)

(72) Inventor: Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/299,814

(22) Filed: Apr. 13, 2023

(65) Prior Publication Data

US 2023/0350330 A1 Nov. 2, 2023

(30) Foreign Application Priority Data

Apr. 28, 2022 (JP) ................................ 2022-075405

(51) Int. Cl.

| | |
|---|---|
| ***G03G 15/20*** | (2006.01) |
| ***B42C 1/12*** | (2006.01) |
| ***B65H 37/02*** | (2006.01) |
| ***G03G 15/00*** | (2006.01) |

(52) U.S. Cl.

CPC ............. *G03G 15/206* (2013.01); *B42C 1/12* (2013.01); *B65H 37/02* (2013.01); *G03G 15/2064* (2013.01); *G03G 15/6544* (2013.01); *G03G 2215/00936* (2013.01); *G03G 2215/2051* (2013.01)

(58) Field of Classification Search

None

See application file for complete search history.

(56) References Cited

U.S. PATENT DOCUMENTS

| | | | | |
|---|---|---|---|---|
| 4,343,673 A * | 8/1982 | Smith, Jr. | ............... | B29C 66/43 156/290 |
| 7,158,748 B2 | 1/2007 | Kwak et al. | | |
| 8,594,551 B2 * | 11/2013 | Nonaka | .............. | G03G 15/2053 399/329 |

(Continued)

FOREIGN PATENT DOCUMENTS

| | | |
|---|---|---|
| JP | 2005-096202 A | 4/2005 |
| JP | 2006-184700 A | 7/2006 |

(Continued)

OTHER PUBLICATIONS

Extended European Search Report dated Sep. 15, 2023, in related European Patent Application No. 23168443.2.

(Continued)

*Primary Examiner* — Arlene Heredia Ocasio

(74) *Attorney, Agent, or Firm* — Venable LLP

(57) ABSTRACT

An image forming apparatus includes an image forming portion, a fixing portion configured to perform a fixing process in which the fixing portion fixes the image and the powder adhesive to the sheet, and a bonding portion configured to perform a bonding process in which the bonding portion bonds the plurality of sheets to each other with the powder adhesive by using the heating member to heat and press the plurality of sheets, wherein P1<P2 is satisfied, where P1 (MPa) is a peak value of pressure received by the sheet in the fixing process, and P2 (MPa) is a peak value of pressure received by the sheet in the bonding process.

12 Claims, 11 Drawing Sheets

(56) References Cited

U.S. PATENT DOCUMENTS

| | | | | |
|---|---|---|---|---|
| 8,838,014 | B2 * | 9/2014 | Matsue | G03G 15/6544 399/408 |
| 11,036,153 | B2 | 6/2021 | Ishizuka et al. | |
| 2011/0286778 | A1 | 11/2011 | Kwarta et al. | |
| 2013/0051886 | A1 | 2/2013 | Watanabe et al. | |
| 2013/0130170 | A1 | 5/2013 | Watanabe et al. | |
| 2014/0072388 | A1 | 3/2014 | Hashimoto et al. | |
| 2021/0018854 | A1 | 1/2021 | Ishizuka et al. | |
| 2021/0191297 | A1 | 6/2021 | Yamaguchi et al. | |
| 2024/0326505 | A1 * | 10/2024 | Chonan | B42D 5/003 |

FOREIGN PATENT DOCUMENTS

| | | | |
|---|---|---|---|
| JP | 2012-131041 | A | 7/2012 |
| JP | 2014-237291 | A | 12/2014 |
| JP | 2015-028592 | A | 2/2015 |
| JP | 2021-018269 | A | 2/2021 |
| JP | 2021-102522 | A | 7/2021 |
| JP | 2022-026471 | A | 2/2022 |
| KR | 2005-0071960 | A | 7/2005 |

OTHER PUBLICATIONS

Communication dated Oct. 20, 2025, in European Patent Application No. 23168443.2.

* cited by examiner

IMAGE FORMING APPARATUS WITH FIXING VIA ROTARY HEATER AND BONDING VIA HEATER CONFIGURED TO MOVE IN THICKNESS DIRECTION

BACKGROUND OF THE INVENTION

Field of the Invention

The present invention relates to an image forming apparatus that forms images on sheets.

Description of the Related Art

Image forming apparatuses, such as printers, copying machines, and multi-function printers, that include a function for binding a plurality of sheets are known. The image forming apparatuses include the function in addition to an image forming function for forming images on sheets. Japanese Patent Application Publication No. 2014-237291 describes a sheet binding method and an image forming apparatus. In the sheet binding method, each sheet of a sheet stack is applied with bonding toner, and the sheets of the sheet stack are bound together by heating and pressing the sheet stack by using a heating head.

However, in the configuration described in Japanese Patent Application Publication No. 2014-237291, sufficient bonding strength may not be obtained when sheets are bound together, due to the surface roughness of the sheets.

SUMMARY OF THE INVENTION

The present invention provides an image forming apparatus that can bond sheets to each other with a more stable bonding strength.

According to an aspect of the invention, an image forming apparatus includes an image forming portion configured to form an image on a sheet by using printing toner and apply powder adhesive onto the sheet, a fixing portion including a rotary heating member configured to rotate, and a facing member that forms a nip portion between the rotary heating member and the facing member, the fixing portion being configured to perform a fixing process in which the fixing portion fixes the image and the powder adhesive to the sheet by heating and pressing the sheet while nipping and conveying the sheet in the nip portion, and a bonding portion including a heating member configured to move in a thickness direction of a plurality of sheets stacked after the fixing process, the bonding portion being configured to perform a bonding process in which the bonding portion bonds the plurality of sheets to each other with the powder adhesive by using the heating member to heat and press the plurality of sheets, wherein $P1<P2$ is satisfied, where P1 (MPa) is a peak value of pressure received by the sheet in the fixing process, and P2 (MPa) is a peak value of pressure received by the sheet in the bonding process.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

Image Forming Apparatus Body

Figure 1:
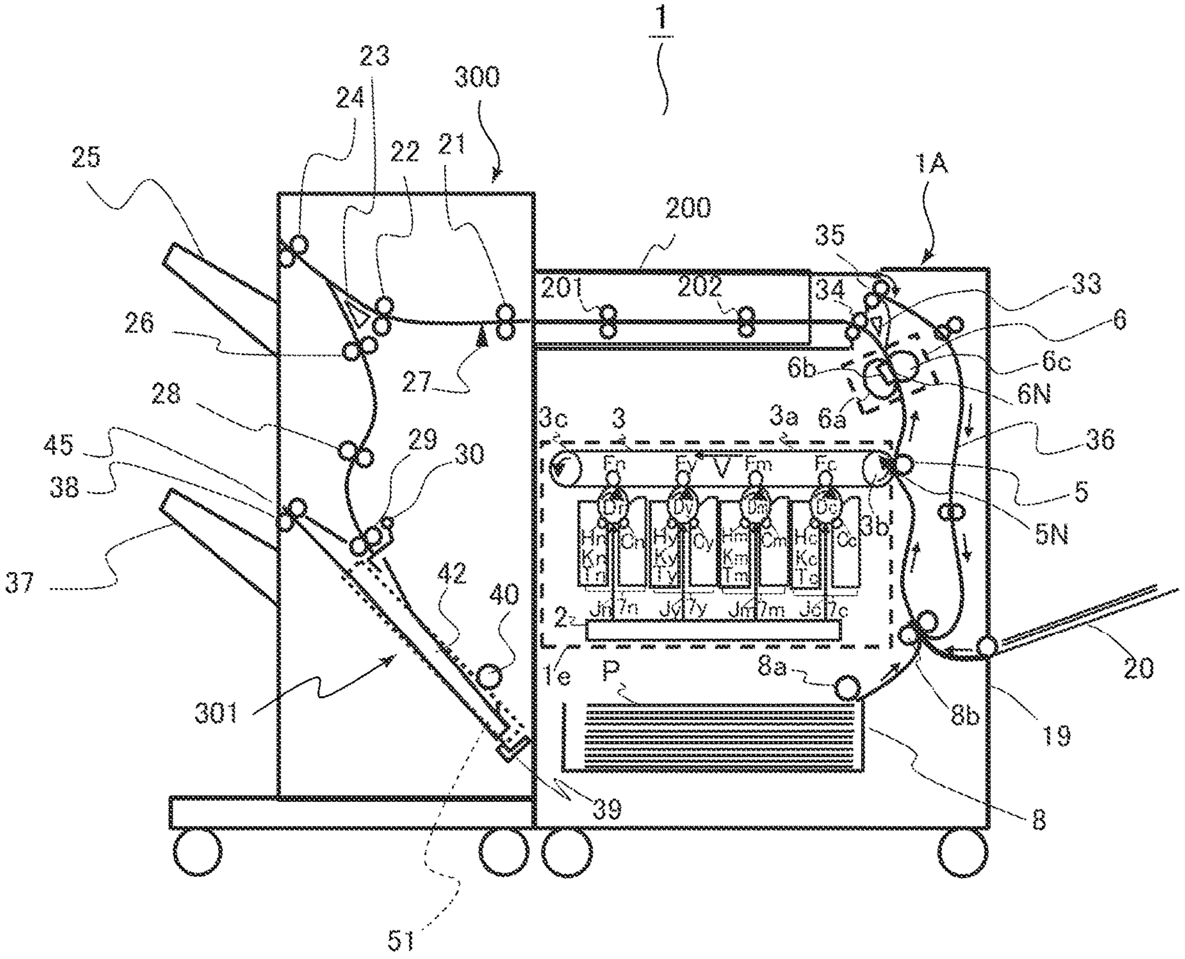
FIG. 1 is a schematic diagram of an image forming apparatus of one embodiment.

A configuration of an image forming apparatus body 1A of an image forming apparatus 1 of one embodiment will be described with reference to FIG. 1. FIG. 1 is a schematic diagram illustrating a cross section of the image forming apparatus 1. The image forming apparatus (image forming system) 1 includes the image forming apparatus body (printer body) 1A and a post-process apparatus 300. The post-process apparatus 300 serves as a sheet processing apparatus, which performs a process on a sheet on which an image is formed by the image forming apparatus body 1A.

The image forming apparatus body 1A includes a sheet cassette 8, an image forming unit 1*e*, a fixing apparatus 6, and a housing 19. The sheet cassette 8 serves as a sheet storing portion, which stores sheets P that are recording materials. The image forming unit 1*e* serves as an image forming portion, the fixing apparatus 6 serves as a fixing portion, and the housing 19 houses the sheet cassette 8, the image forming unit 1*e*, and the fixing apparatus 6. The image forming apparatus body 1A has a printing function that produces a printed object. Specifically, the image forming apparatus body 1A produces the printed object by causing the image forming unit 1*e* to form a toner image on the sheet P fed from the sheet cassette 8, and causing the fixing apparatus 6 to fix the toner image to the sheet P. In the present embodiment, the maximum size of the sheet P, on which an image can be formed, is an A4 size (in which the sheet P is 297 mm long and 210 mm wide). The A4-size sheet is conveyed in the longitudinal direction of the sheet P, and an image is formed on the sheet P. The sheet conveyance speed is 300 mm/sec. The sheet (recording material) P may be a paper sheet, such as a plain paper sheet or a thick paper sheet, a plastic film, a cloth sheet, a sheet material, such as a coated paper sheet, on which certain surface treatment has been performed, a specially-shaped sheet material, such as an envelope or an index paper sheet, or any one of a variety of sheets having different sizes and materials.

The sheet cassette 8 is inserted in a lower portion of the image forming apparatus body 1A, so as to be able to be drawn from the housing 19. The sheet cassette 8 stores a plurality of sheets P. The sheet P stored in the sheet cassette 8 is fed from the sheet cassette 8 by a feeding roller 8*a*, which serves as a feeding portion; and is conveyed by a conveyance roller pair 8*b*. In another case, sheets may be set on a multi-purpose tray 20, and fed one by one.

The image forming unit 1*e* is a tandem-type electrophotographic unit, which includes four process cartridges 7*n*, 7*y*, 7*m*, and 7*c*, a scanner unit 2, and a transfer unit 3. Each process cartridge is a unit that contains a plurality of components used for the image forming process, and the plurality of components can be collectively replaced with other components by replacing the unit with another unit.

The process cartridges 7*n*, 7*y*, 7*m*, and 7*c* have substantially the same configuration, except that the types of toner contained in four toner storage portions Kn, Ky, Km, and Kc are different from each other. The process cartridges 7*n*, 7*y*, 7*m*, and 7*c* respectively include photosensitive drums Dn, Dy, Dm, and Dc, which are image bearing members; charging rollers Cn, Cy, Cm, and Cc, which are chargers; and the toner storage portions Kn, Ky, Km, and Kc, which store the toner and supply the toner to the respective photosensitive drums.

The three toner storage portions Ky, Km, and Kc of the four toner storage portions, which are illustrated on the right side in FIG. 1, store the toner used for forming a visible image on the sheet P. Specifically, the toner storage portions Ky, Km, and Kc respectively contain printing toners for yellow, magenta, and cyan. In contrast, the toner storage portion Kn, which is illustrated on the leftmost side in FIG. 1, contains bonding toner Tn, which serves as powder adhesive used for a pressure bonding process performed after the printing process.

In the present embodiment, when a black image, such as text, is printed, the image is expressed with a process black for which yellow toner (Ty), magenta toner (Tm), and cyan toner (Tc) are superposed on each other. However, a fifth process cartridge for a black printing toner may be added to the image forming unit 1*e* so that a black image can be expressed with the black printing toner. The present disclosure is not limited to this. The types and the number of types of printing toner may be changed in accordance with the use of the image forming apparatus body 1A. For example, the image forming unit 1*e* may include only two process cartridges: a process cartridge for black printing toner, and a process cartridge for bonding toner. In another case, a printing toner may be used as the bonding toner. In this case, when a visible image is formed on the sheet P by using a printing toner, a toner image is formed also on a pressure bonding portion (i.e., a portion of the sheet P on which a pressure bonding process is to be performed), by using the printing toner.

The scanner unit 2 is disposed below the process cartridges 7*n*, 7*y*, 7*m*, and 7*c*, and above the sheet cassette 8. The scanner unit 2 is an exposure portion of the present embodiment, which forms electrostatic latent images on the photosensitive drums Dn, Dy, Dm, and Dc of the process cartridges 7*n*, 7*y*, 7*m*, and 7*c* by emitting laser beams Jn, Jy, Jm, and Jc to the photosensitive drums Dn, Dy, Dm, and Dc.

The transfer unit 3 includes a transfer belt 3*a*, which serves as an intermediate transfer member (i.e., a secondary image bearing member). The transfer belt 3*a* is a belt member wound around a secondary transfer inner roller 3*b* and a stretching roller 3*c*, and the outer circumferential surface of the transfer belt 3*a* faces the photosensitive drums Dn, Dy, Dm, and Dc of the process cartridges 7*n*, 7*y*, 7*m*, and 7*c*. On the inner circumferential surface side of the transfer belt 3*a*, primary transfer rollers Fn, Fy, Fm, and Fc are respectively disposed at positions corresponding to the photosensitive drums Dn, Dy, Dm, and Dc. In addition, a secondary transfer roller 5 that serves as a transfer member is disposed at a position at which the secondary transfer roller 5 faces the secondary transfer inner roller 3*b*. A transfer nip 5N is formed between the secondary transfer roller 5 and the transfer belt 3*a*, and serves as a transfer portion (i.e., a secondary transfer portion) in which a toner image is transferred from the transfer belt 3*a* to the sheet P. The fixing apparatus 6 is disposed above the secondary transfer roller 5.

Fixing Apparatus

Figure 2:
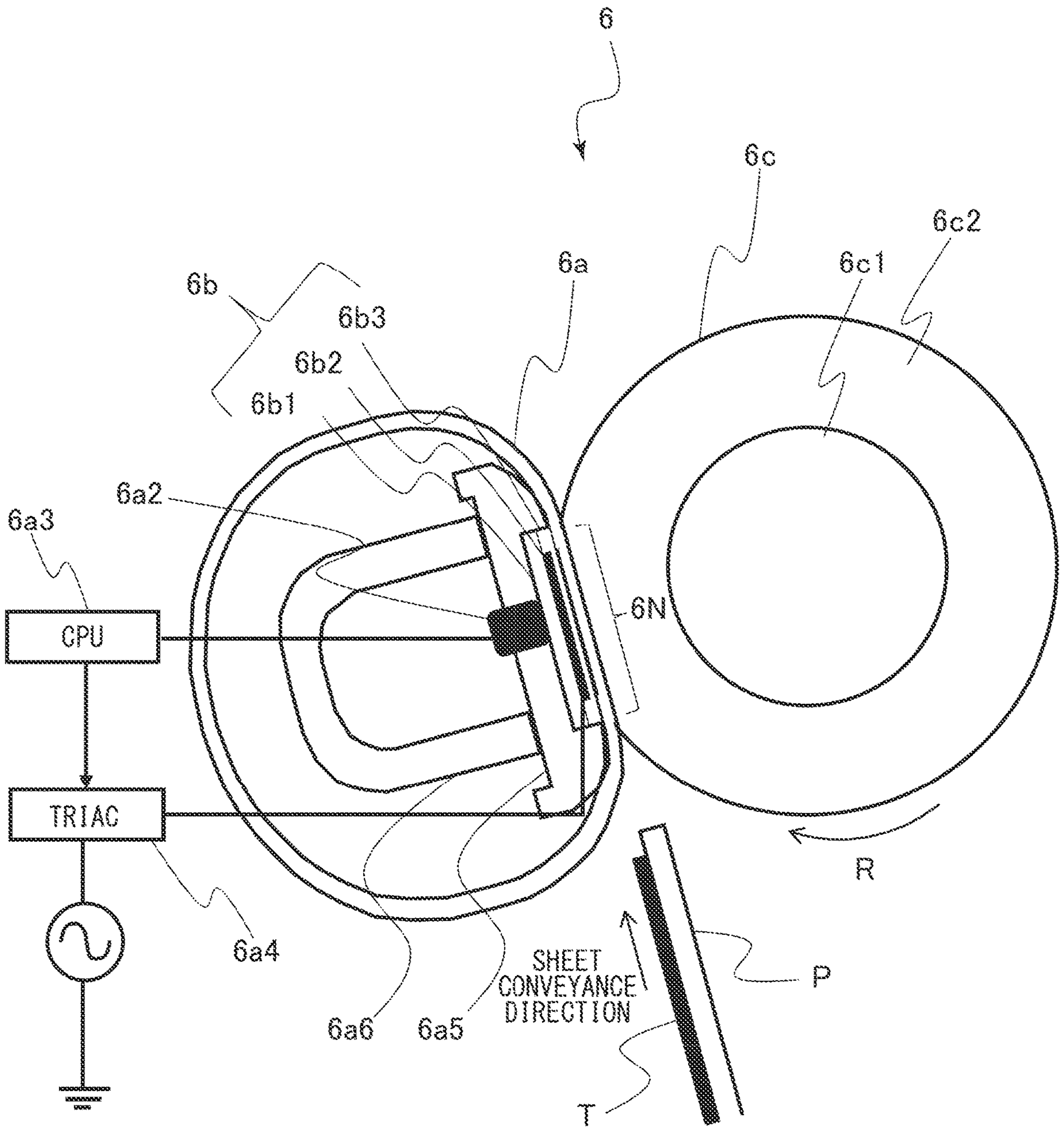
FIG. 2 is a diagram illustrating a configuration of a fixing apparatus of the embodiment.

FIG. 2 is a detailed diagram of the fixing apparatus 6. The fixing apparatus 6 includes a tubular fixing film (endless belt) 6*a* that serves as a rotary heating member, a pressing roller 6*c* that serves as a facing member (pressing member), and a heater 6*b* that serves as a heating portion and that is in contact with the inner surface of the fixing film 6*a*. The pressing roller 6*c* is abutted against the heater 6*b* via the fixing film 6*a*, and the pressing roller 6*c* and the fixing film 6*a* form a fixing nip 6N. The fixing film 6*a* and the pressing roller 6*c* are a rotary member pair that nips and conveys a sheet in the fixing nip 6N, which serves as a nip portion.

The fixing film 6*a* is a tubular (endless) rotary member made of a flexible film material. The fixing film 6*a* includes a base layer, an elastic layer formed on the base layer, and a release layer formed on the elastic layer. The base layer may be made of polyimide, and have a thickness of 60 μm. The elastic layer may be made of silicone rubber, and have a thickness of 0.3 mm. The release layer may be made of fluororesin (PFA), and have a thickness of 20 μm. For making the fixing film smooth sufficiently, the surface roughness (arithmetic average roughness Ra) of the surface of the fixing film is made equal to or smaller than 0.4 μm. The surface roughness (Ra) is measured by using a surface roughness measuring instrument, SE-3400 (product name), made by Kosaka Laboratory Ltd. In the measurement, the cutoff wavelength is set equal to or larger than 0.80 mm.

The inner diameter of the fixing film 6*a* is 24 mm, and a width (longitudinal width) of the fixing film 6*a* in a direction orthogonal to the sheet conveyance direction is 240 mm. Hereinafter, the direction (i.e., the rotation-axis direction of the fixing film 6*a* and the pressing roller 6*c*) orthogonal to the sheet conveyance direction is referred to as the longitudinal direction of the fixing apparatus 6. The longitudinal direction of the fixing apparatus 6 is the main scanning direction in the image forming operation.

The surface of the fixing film 6*a* contacts the toner that has been melted or softened. Thus, the surface of the toner obtained after the fixing process (that is, after the sheet has passed through the fixing nip 6N) is formed in accordance with the shape of the surface of the fixing film 6*a*, as described below.

The pressing roller 6*c* includes an iron core metal 6*c*1, an elastic layer 6*c*2, and a release layer. The elastic layer 6*c*2 is made of silicone rubber, and has a thickness of 4.0 mm. The release layer is formed as the outermost surface of the pressing roller 6*c*, and is made of fluororesin such as PFA. The hardness of the silicone rubber used in the pressing roller 6*c* is about 20°, measured by using an ASKER Durometer Type C made by KOBUNSHI KEIKI CO., LTD. The iron core metal 6*c*1 of the pressing roller 6*c* includes a shaft portion that projects from an end portion of the iron core metal 6*c*1, and the shaft portion is connected to a driving gear. The length of an outer circumferential portion (i.e., the elastic layer 6*c*2 and the release layer) of the pressing roller 6*c* in the axial direction of the pressing roller 6*c* is 230 mm, and the diameter of the outer circumferential portion is 25 mm.

The heater 6*b* serves as a heating portion. In the heater 6*b*, a heat generating resistor 6*b*2 and an insulation protection layer 6*b*3 are disposed on a thin-plate-like substrate 6*b*1. The substrate 6*b*1 contains ceramic, such as alumina, as a main component; and has a thickness of 0.7 mm. The heat generating resistor 6*b*2 generates heat when energized, and is made of a material such as a silver-palladium (Ag/Pd) alloy. In the present embodiment, the insulation protection layer 6*b*3 is made of glass. A width of the heater 6*b* in the sheet conveyance direction is 8.7 mm, and a width of the heater 6*b* in the longitudinal direction of the fixing apparatus 6 is 240 mm.

A temperature detection element 6*a*2, such as a thermistor, is in contact with the substrate 6*b*1; and is electrically connected to a CPU 6*a*3. The heater 6*b* is supplied with electric power from an alternate-current power source via a triac 6*a*4, and the temperature of the heater 6*b* rises when the heat generating resistor 6*b*2 is energized. The temperature of the heater 6*b* is detected by the temperature detection element 6*a*2. That is, the output (e.g., the voltage) from the temperature detection element 6*a*2 changes in accordance with the temperature of the heater 6*b*. The CPU 6*a*3 controls the energization of the heat generating resistor 6*b*2, via the triac 6*a*4, based on the signal from the temperature detection element 6*a*2. For example, if the temperature detected by the temperature detection element 6*a*2 is lower than a predetermined temperature, the CPU 6*a*3 increases the electric power supplied to the heater 6*b* so that the temperature of the heater 6*b* rises. In contrast, if the temperature detected by the temperature detection element 6*a*2 is higher than a predetermined temperature, the CPU 6*a*3 decreases the electric power supplied to the heater 6*b* so that the temperature of the heater 6*b* falls. With these operations, the temperature of the heater 6*b* is kept constant. In the present embodiment, the predetermined temperature is set so that the surface temperature of the fixing film 6*a* is 175° C., for example.

The heater 6*b* is held by a holding member 6*a*5, which is made of heat-resistant resin such as liquid crystal polymer (LCP). The holding member 6*a*5 also has a guide function that guides the rotation of the fixing film 6*a*. A stay 6*a*6 is a member made of metal and used for applying the pressure of a spring (not illustrated), to the holding member 6*a*5. The pressing roller 6*c* is pressed against the heater 6*b*, via the fixing film 6*a*, by a pressing portion such as a spring, at a total pressure of 25 kgf. With this operation, the fixing nip 6N is formed between the fixing film 6*a* and the heater 6*b*. That is, the holding member 6*a*5 and the heater 6*b* are disposed in an internal space of the fixing film 6*a*, so that the fixing nip 6N is formed between the fixing film 6*a* and the pressing roller 6*c*. Thus, the holding member 6*a*5 and the heater 6*b* function as a nip forming member.

In the fixing film 6*a* of the present embodiment, the fluororesin layer is formed above the polyimide base layer. In this case, an elastic layer having a thickness of about 200 to 300 μm may be formed on the polyimide base layer, and the fluororesin layer may be formed on the elastic layer, as the outermost layer of the fixing film 6*a*.

Figure 3A:
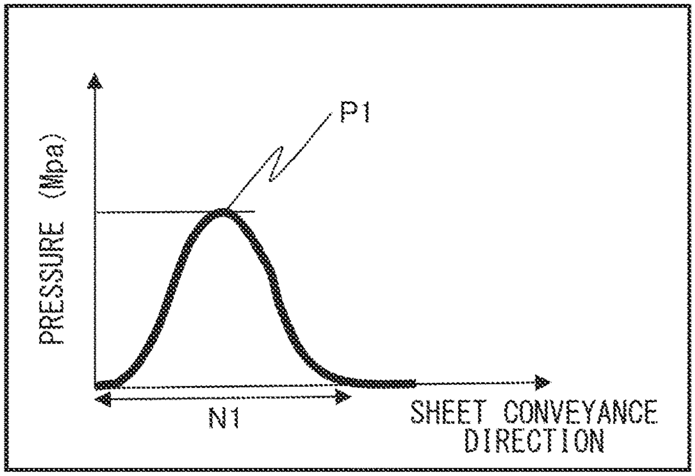
FIG. 3A is a diagram illustrating a distribution of pressure received by a sheet in the fixing apparatus of the embodiment.

FIG. 3A illustrates a pressure distribution of a center portion of the fixing nip 6N. The center portion of the fixing nip 6N is a portion formed in the longitudinal direction of the fixing apparatus 6, and the pressure distribution is a distribution obtained in the sheet conveyance direction. The pressure distribution was measured by using an inter-roller pressure distribution measuring system (product name: PINCH) made by Nitta Corporation. Specifically, the pressure distribution was measured such that a pressure-sensitive sensor sheet (not illustrated) that includes piezoelectric elements was nipped in the fixing nip 6N. The resolution of the pressure-sensitive sensor sheet is 0.5 mm in the sheet conveyance direction. The pressure distribution illustrated in FIG. 3A was obtained by repeating the measurement five times by using the pressure-sensitive sensor sheet and calculating an average value.

Figure 3B:
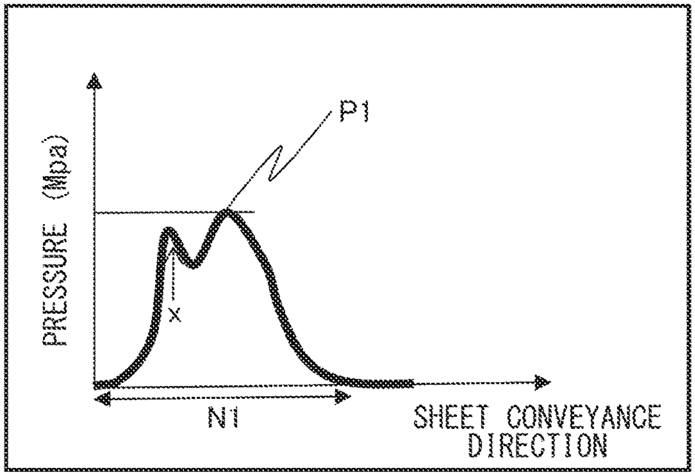
FIG. 3B is a diagram illustrating a distribution of pressure received by a sheet in the fixing apparatus of the embodiment.

In a configuration of the present embodiment as one example, the pressure width (i.e., a nip width N1) of the fixing nip 6N in the sheet conveyance direction is 9.0 mm, and the peak value (i.e., a peak pressure P1) of the pressure in the fixing nip 6N is 0.2 MPa. The peak pressure P1 is the maximum value of the pressure that the sheet receives in the fixing process performed by the fixing apparatus (fixing portion) 6. The pressure that the sheet receives in the fixing process is the magnitude of load (i.e., a surface pressure) applied to a unit area of the sheet that is passing through the fixing nip 6N. The load is applied to the sheet in a direction orthogonal to the sheet surface. For measuring the peak pressure P1, it is preferable that the resolution be equal to or smaller than 10% of the pressure width in the sheet conveyance direction. In addition, as illustrated in FIG. 3B, an electronic noise (x) may be superimposed on a pressure distribution in the measurement of the pressure distribution. In such a case, the influence caused by the electronic noise is reduced by repeating the measurement as in the present embodiment.

The pressure distribution of the fixing nip 6N obtained at an end portion of the fixing nip 6N in the longitudinal direction of the fixing apparatus 6 is the same as the pressure distribution of the center portion of the fixing nip 6N, which is a portion formed in the longitudinal direction. In addition, as illustrated in FIG. 2, the pressing roller 6*c* is rotated in a direction R indicated by an arrow, by the power transmitted from a motor (not illustrated) via a driving gear. The fixing film 6*a* is rotated by the rotation of the pressing roller 6*c*. The sheet P that bears a toner image T whose toner is still not fixed to the sheet P moves together with the fixing film 6*a* in the fixing nip 6N. Specifically, the sheet P is nipped and conveyed in the fixing nip 6N while a surface of the sheet P on which the toner image T is borne is in contact with the outer surface of the fixing film 6*a*. While the sheet P is passing through the fixing nip 6N, the toner image T on the sheet P is heated by the fixing film 6*a* heated by the heat (non-radiant heat) from the heater 6*b*, while the toner image T is pressed in the fixing nip 6N, so that the toner image T is fixed to the sheet P. In the fixing process, while an image formed of the printing toner is fixed to the sheet P, a bonding toner Tn on the sheet P is also heated and pressed. As a result, the layer (bonding layer) of the bonding toner Tn is not easily peeled off from the sheet P.

In this system (i.e., a heating film system), since the fixing film 6*a* and the heater 6*b* have a small heat capacity, it is possible to increase the temperature of the surface of the fixing film to a high temperature, quickly and with less amount of heat. That is, the system has excellent quick-start performance.

Image Forming Operation

Next, referring to FIG. 1 again, an operation of the image forming apparatus body 1A will be described. When the image forming apparatus body 1A receives image data to be printed and a print-execution command, a control portion (not illustrated) of the image forming apparatus body 1A starts a series of operations (i.e., an image forming operation) for conveying the sheet P and forming an image on the sheet P. In the image forming operation, the sheet P is fed, one by one, from the sheet cassette 8; and is conveyed toward the transfer nip 5N via the conveyance roller pair 8*b*.

In parallel with the conveyance of the sheet P, the process cartridges 7*n*, 7*y*, 7*m*, and 7*c* are driven in a sequential manner, and the photosensitive drums Dn, Dy, Dm, and Dc are driven and rotated. When the photosensitive drums Dn, Dy, Dm, and Dc are driven and rotated, the surfaces of the photosensitive drums Dn, Dy, Dm, and Dc are respectively charged uniformly by the charging rollers Cn, Cy, Cm, and Cc. The scanner unit 2 emits laser beams Jn, Jy, Jm, and Jc, modulated in accordance with the image data, to the photosensitive drums Dn, Dy, Dm, and Dc of the process cartridges 7*n*, 7*y*, 7*m*, and 7*c*; and forms electrostatic latent images on the surfaces of the photosensitive drums Dn, Dy, Dm, and Dc. The electrostatic latent images formed on the photosensitive drums Dn, Dy, Dm, and Dc are then developed into toner images by using the respective types of toner borne by developing rollers Hn, Hy, Hm, and Hc disposed in the toner storage portions Kn, Ky, Km, and Kc of the process cartridges 7*n*, 7*y*, 7*m*, and 7*c*.

Note that a layer (bonding layer) of the bonding toner Tn, which is formed on the photosensitive drum Dn by the electrostatic latent image formed on the photosensitive drum Dn being developed by using the bonding toner Tn, is not primarily intended to deliver visual information. In this point, the toner image of the bonding toner is different from other toner images (i.e., usual toner images) of the printing toner, which are used for forming images, such as figures or text, on the sheet P. In the following description, however, the layer of the bonding toner Tn, which has been developed in the electrophotographic process for applying the bonding toner Tn onto the sheet P in a predetermined pattern of application, will also be regarded as one of toner images.

The transfer belt 3*a* rotates counterclockwise in FIG. 1 (that is, in a direction indicated by an arrow V). Toner images formed by the process cartridges 7*n*, 7*y*, 7*m*, and 7*c* are primary-transferred from the photosensitive drums Dn, Dy, Dm, and Dc to the transfer belt 3*a* by an electric field produced between the photosensitive drums Dn, Dy, Dm, and Dc and primary transfer rollers Fn, Fy, Fm, and Fc.

The toner image, borne by the transfer belt 3*a*, reaches the transfer nip 5N; and is secondary-transferred to the sheet P, which has been conveyed to the transfer nip 5N, by an electric field produced between the secondary transfer roller 5 and the secondary transfer inner roller 3*b*.

The sheet P is then conveyed to the fixing apparatus 6, and is subjected to a heat fixing process. Specifically, when the sheet P passes through the fixing nip 6N, the toner image on the sheet P is heated and pressed, and thereby the printing toners Ty, Tm, and Tc and the bonding toner Tn are melted. After that, the printing toners Ty, Tm, and Tc and the bonding toner Tn are solidified and fixed to the sheet P, so that an image fixed to the sheet P can be obtained.

A switching guide 33 is a flap-like guide member, and switches the conveyance direction when a single-side printing mode or a double-side printing mode is selected. The single-side printing mode is a mode for forming an image on one side of the sheet P, and the double-side printing mode is a mode for printing images on both sides of the sheet P. When the single-side printing mode is selected, the switching guide 33 guides the sheet P toward a discharging roller pair 34. When the double-side printing mode is selected, the switching guide 33 conveys the sheet P toward a switch-back roller pair 35. The switch-back roller pair 35 reverses the rotational direction when discharging the sheet P up to the trailing edge of the sheet P, and thereby guides the sheet P toward a duplex conveyance path 36 for the double-side printing. The sheet P having been conveyed to the duplex conveyance path 36 passes through the secondary transfer portion and the fixing portion again, so that an image is formed on a side of the sheet P on which no image is formed. After that, the switching guide 33 guides the sheet P toward the discharging roller pair 34. The discharging roller pair 34 conveys the sheet P to the post-process apparatus 300 through the intermediate conveyance unit 200, which includes conveyance roller pairs 201 and 202. The post-process apparatus 300 serves as a sheet processing apparatus.

Post-Process Apparatus

The post-process apparatus 300 includes a conveyance mechanism, a binding portion 301, and stacking portions 25 and 37. The conveyance mechanism receives the sheet P from the image forming apparatus body 1A, and conveys the sheet P The binding portion 301 binds the sheets P together. The stacking portions 25 and 37 are portions on which the sheet P, which has been processed or which needs no process, is stacked as a product from the image forming apparatus 1. The binding portion 301 includes an aligning portion and a bonding portion. The aligning portion is a portion on which a plurality of sheets P is stacked and which aligns the plurality of sheets P. The bonding portion bonds the plurality of sheets P by heating and pressing the sheet stack stacked on the aligning portion.

The post-process apparatus 300 of the present embodiment is a floor-standing type. That is, the post-process apparatus 300 is installed on the installation surface on which the image forming apparatus body 1A is installed. In addition, the post-process apparatus 300 is disposed adjacent to the image forming apparatus body 1A in the horizontal direction. The binding portion 301 is disposed in a lower portion of the post-process apparatus 300. Note that the sheet conveyance speed of the intermediate conveyance unit 200 and the post-process apparatus 300 is 600 mm/sec, which is higher than the process speed (300 mm/sec) of the image forming apparatus body 1A.

The sheet P that has been discharged from the intermediate conveyance unit 200 is delivered to a conveyance roller pair 21 of the post-process apparatus 300. A conveyance roller 22 is controlled so as to accelerate the sheet P at a predetermined timing that is determined based on a time at which an inlet sensor 27 detects the passage of the trailing edge of the sheet P. In a case where the destination to which the sheet is to be discharged is an upper discharging tray 25, each roller is controlled so that the sheet is decelerated to a predetermined discharge speed when the trailing edge of the sheet reaches a position between the conveyance roller 22 and a reversing roller 24, and that the sheet is discharged to the upper discharging tray 25.

In a case where the destination to which the sheet is to be discharged is a lower discharging tray 37, the conveyance of the sheet is temporarily stopped at a timing at which the trailing edge of the sheet P passes through a backflow check valve 23, which is urged toward a clockwise direction in FIG. 1 by a spring (not illustrated). After that, the sheet P is switch-backed and delivered to an inner discharging roller 26 by the reversing roller 24. The sheet P is then sent from the inner discharging roller 26 to a kickout roller 29 via an intermediate conveyance roller 28, and is discharged to an intermediate stacking portion 42 of the binding portion 301 by the kickout roller 29. A trailing-edge holding member 30 holds the trailing edge of the sheet P stacked on the intermediate stacking portion 42, for preventing the leading edge of a following sheet P discharged by the kickout roller 29, from colliding with the preceding sheet P.

Binding Portion

The binding portion 301 includes the intermediate stacking portion 42, the aligning portion, and a heat-and-pressure bonding unit 51. The intermediate stacking portion 42 is a portion on which a plurality of sheets P to be processed is stacked. The aligning portion includes a longitudinal-alignment reference plate 39 and a semicircular roller 40, which are used for aligning the sheets P stacked on the intermediate stacking portion 42. The heat-and-pressure bonding unit 51 serves as a bonding portion.

The binding portion 301 functions as a booklet forming portion (booklet bonding portion). The booklet forming portion forms a booklet by causing the heat-and-pressure bonding unit 51 to bond the sheets P via the bonding toner Tn, which serves as a bonding medium and which has been applied onto the sheets P in the image forming apparatus body 1A. The booklet bound in this manner is advantageous in safety because the booklet needs no metal staples of a stapler. In addition, the booklet bound in this manner is advantageous for increasing user convenience because the need for removing metal staples in a shredding process, performed by using a shredder or the like, can be eliminated.

Next, a method of aligning sheets will be described with reference to FIG. 1 and FIGS. 4A to 4D. Note that the longitudinal direction of the sheet P is defined as a Y direction, the lateral direction of the sheet P is defined as an X direction, and the height direction is defined as a Z direction. The longitudinal direction is a direction extending along the sheet conveyance direction. The lateral direction is a direction orthogonal to the sheet conveyance direction and extending along one of sides of the sheet. The height direction is a direction orthogonal to the sheet surface.

Figure 4A:
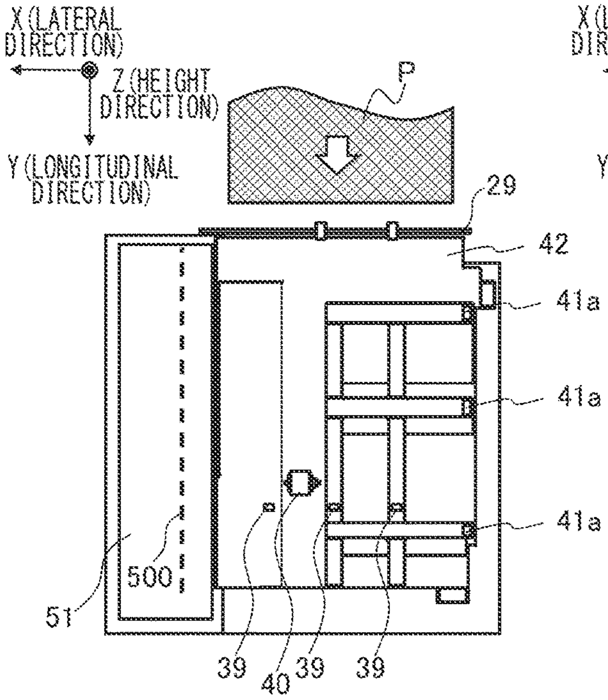
FIG. 4A is a diagram illustrating a method of aligning sheets in a post-process apparatus of the embodiment.

As illustrated in FIG. 4A, the semicircular roller 40 is disposed rotatably in the intermediate stacking portion 42. The semicircular roller 40 pushes the sheet P that has passed though the kickout roller 29, to the longitudinal-alignment reference plate 39. Specifically, the semicircular roller 40 conveys the sheet toward the longitudinal-alignment reference plate 39 at a predetermined timing. With this operation, the sheet position is aligned in the Y direction.

Figure 4B:
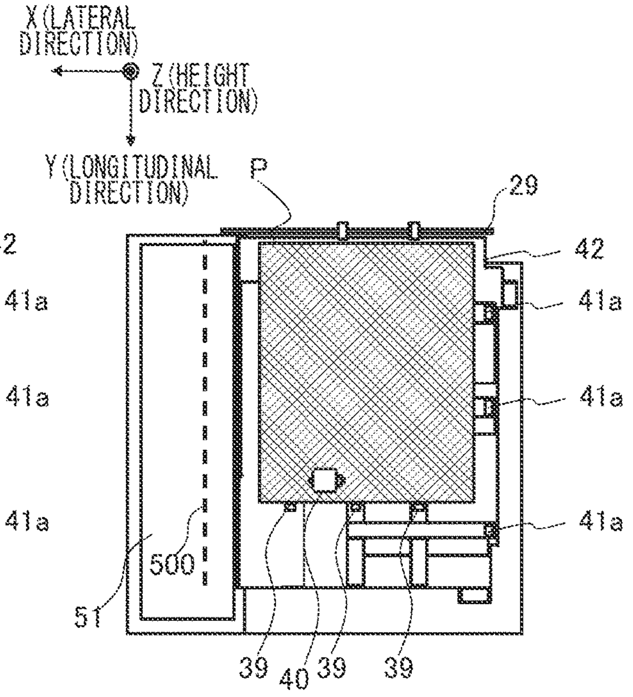
FIG. 4B is a diagram illustrating the method of aligning sheets in the post-process apparatus of the embodiment.

After the sheet P abuts against the longitudinal-alignment reference plate 39 as illustrated in FIG. 4B, the semicircular roller 40 slides on the sheet P. That is, the conveyance pressure (i.e., the abutment pressure at which the semicircular roller 40 is pressed against the sheet P) is adjusted for allowing the semicircular roller 40 to slide on the sheet P after the sheet P abuts against the longitudinal-alignment reference plate 39.

Figure 4C:
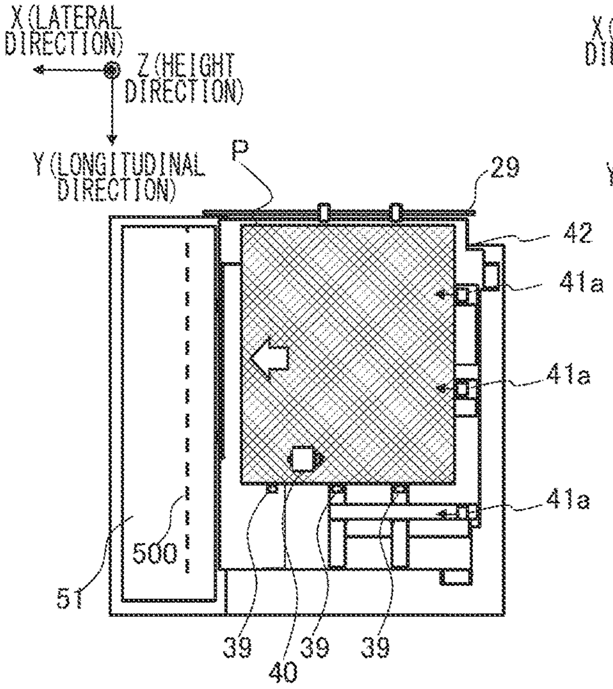
FIG. 4C is a diagram illustrating the method of aligning sheets in the post-process apparatus of the embodiment.
Figure 4D:
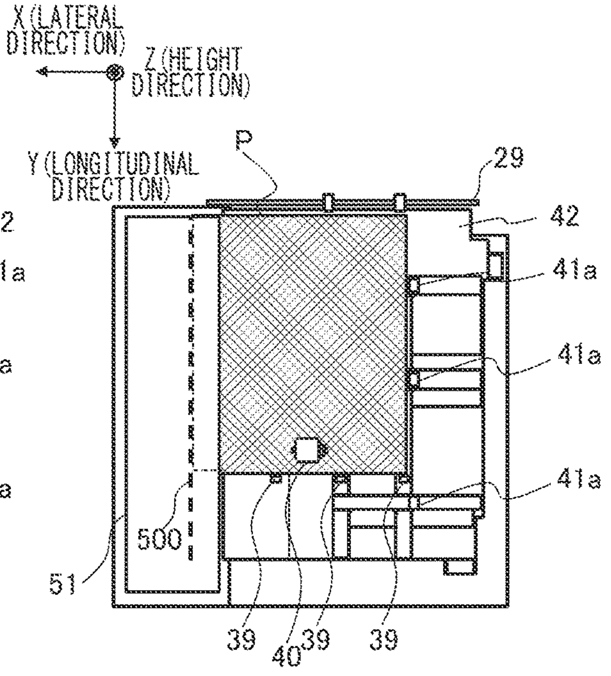
FIG. 4D is a diagram illustrating the method of aligning sheets in the post-process apparatus of the embodiment.

As illustrated in FIG. 4C, in a state where the sheet P is in contact with the longitudinal-alignment reference plate 39, a lateral-alignment jogger 41*a* moves in the X direction until a side edge of the sheet P abuts against a lateral-alignment reference plate 500 (indicated by a dotted line). As a result, the sheet position is aligned in the X direction, as illustrated in FIG. 4D. In this manner, the sheet P is aligned in the X direction and the Y direction, and positioned at a predetermined position.

The aligning operation performed in the X direction and the Y direction may be performed for each sheet or collectively, for a predetermined number of sheets P, which is to be bound together at one time by the heat-and-pressure bonding unit 51. For example, the aligning operation performed in the Y direction may be performed every time a single sheet P is discharged to the intermediate stacking portion 42, and the aligning operation performed in the X direction may be performed collectively on the predetermined number of sheets P, at the same intervals as those of the binding operation of the heat-and-pressure bonding unit 51.

The heat-and-pressure bonding unit 51 produces a sheet bundle, in which the left end portions of the sheets P or the right end portions of the sheets P are bound together, by performing a heat-and-pressure bonding process on the plurality of sheets P. The sheet bundle can be produced accurately in alignment, by the heat-and-pressure bonding unit 51 binding the sheet stack aligned in the X direction and the Y direction, in the intermediate stacking portion 42.

Heat-and-Pressure Bonding Unit

Figure 5A:
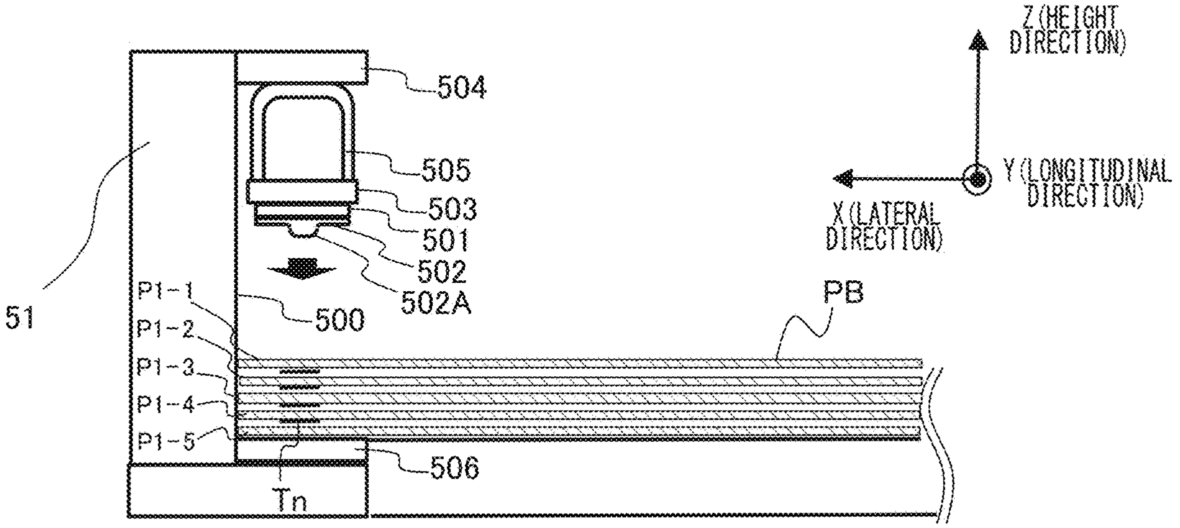
FIG. 5A is a diagram illustrating a configuration of the heat-and-pressure bonding unit of the embodiment.

A configuration of the heat-and-pressure bonding unit 51 will be further described. FIG. 5A is a cross-sectional view of the heat-and-pressure bonding unit 51. The heat-and-pressure bonding unit 51 includes a heating plate 502 that serves as a heating member, a heater 501 that heats the heating plate 502, a support member 503 that supports the heater 501, a metal stay 505, a pressing lever 504, and a pressing plate 506.

The heating plate 502 is an elongated plate-like member made of aluminum, for example. The heating plate 502 is elongated along the longitudinal direction (i.e., the Y direction in the present embodiment), which is parallel with one side of the sheet stacked on the intermediate stacking portion (stacking portion) 42. The heating plate 502 includes a contact portion (pressing portion, head portion) 502A that heats and presses a sheet stack in a state where the heating plate 502 is in contact with the sheet stack. The contact portion 502A has a protruding shape in a cross section perpendicular to the longitudinal direction (i.e., the Y direction). The protruding shape is protruding toward a sheet stack PB. That is, a center portion of the contact portion 502A in the X direction (i.e., the lateral direction) projects toward the pressing plate 506 with respect to both end portions of the contact portion 502A, in the Z direction. The both end portions of the contact portion 502A are end portions in the X direction. In addition, the contact portion 502A is elongated in the longitudinal direction (i.e., the Y direction). Since the contact portion 502A having the protruding shape is formed on the heating plate 502, the heating plate 502 can concentrate the heat and pressure onto a binding position of the sheet stack PB for efficiently performing the bonding.

The heating plate 502 is disposed on the heater 501. The heater 501 is a ceramic heater that contains a heat generating resistor, which serves as a heat source. In size, the heater 501 has a thickness of 1.0 mm, a width of 8.0 mm, and a length of 350 mm. The temperature of the heater 501 is detected by a temperature detection portion, such as a thermistor, disposed on the support member 503. In addition, the heater 501 is supplied with electric power via an electric-power applying portion, such as a power feeding clip, attached to the support member 503. The electric power supplied to the heater 501 is controlled in accordance with the detection result from the temperature detection portion. Thus, the temperature of the heater 501 can be controlled so that the temperature is set at a predetermined temperature. For example, the temperature of the heater 501 is set so that the surface temperature of the contact portion 502A of the heating plate 502 is 200° C.

The heater 501 is supported by the support member 503 made of resin. One side of the support member 503 opposite to the heater 501 in the Z direction is supported by the metal stay 505. All of the heating plate 502, the heater 501, the support member 503, and the metal stay 505 are elongated in the Y direction.

The pressing lever 504 is linked to the metal stay 505, and can be moved in the Z direction by the power from a driving unit (not illustrated). When the pressing lever 504 moves, a movable body constituted by the heating plate 502, the heater 501, the support member 503, and the metal stay 505 moves in the Z direction. Thus, if the pressing lever 504 moves toward a −Z direction, the contact portion 502A of the heating plate 502 abuts against the uppermost sheet of the sheet stack PB, and the sheet stack PB is pressed toward the −Z direction. For example, the driving unit includes a motor, a reduction mechanism, and a rack-and-pinion portion. The motor provides the driving force. The reduction mechanism increases the torque by reducing the rotational speed produced from the motor. The rack-and-pinion portion converts the rotary motion outputted from the reduction mechanism, to the linear motion performed in the Z direction. The pressing lever 504 driven by the driving unit is an example of a pressing mechanism that presses the heating member.

The pressing force of the pressing lever 504 is transmitted to the support member 503, the heater 501, and the heating plate 502, via the metal stay 505 that is a rigid body. In the present embodiment, the heating plate 502 can press the sheet stack PB at a total pressure (pressing force) of 30 kgf (i.e., about 300N).

The pressing plate 506 is disposed at a position that faces the heating plate 502 in the Z direction. The pressing plate 506 bears the pressing force that the sheet stack PB receives from the heating plate 502. The pressing plate 506 is fixed to and supported by a frame of the post-process apparatus 300 such that the pressing plate 506 does not move even when the pressing lever 504 moves. The pressing plate 506 of the present embodiment is a plate having a thickness of 2.0 mm and made of silicone rubber.

The heat-and-pressure bonding unit 51 causes the heating plate 502 to heat the sheet stack PB while pressing the sheet stack PB for two seconds, and then separates the heating plate 502 from the sheet stack PB. In the present embodiment, the heat-and-pressure bonding unit 51 can perform the bonding process on up to five sheets P, at one time (i.e., in one round of the bonding process). In this case, the maximum grammage of the sheets P is 90 g/m$^2$.

Figure 5B:
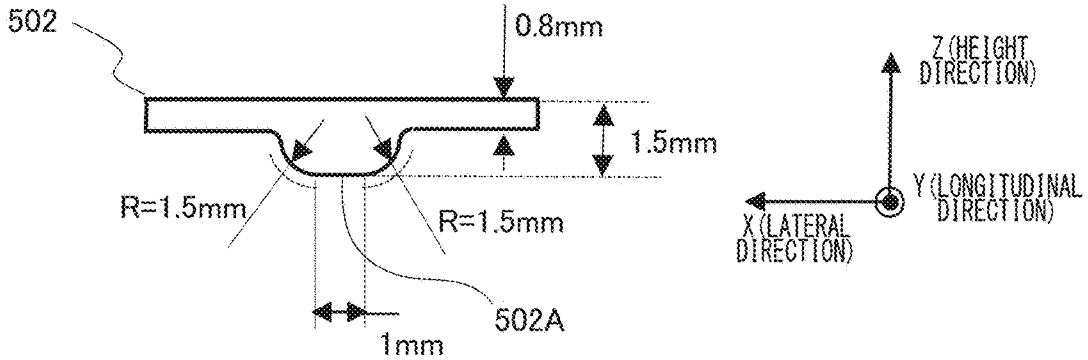
FIG. 5B is a diagram illustrating the configuration of the heat-and-pressure bonding unit of the embodiment.

FIG. 5B illustrates a cross-sectional shape of the heating plate 502 of the present embodiment. The contact portion 502A includes a flat portion having a width of 1.0 mm, and curved portions formed on both sides of the flat portion and having a radius of curvature R of 1.5 (mm). In addition, the length of the heating plate 502 in the Y direction is 300 mm. The heating plate 502 has a shape that is elongated in the Y direction, which is the longitudinal direction of the heating plate 502. That is, the length of the heating plate 502 in the Y direction (i.e., the longitudinal direction) is larger than the length of the heating plate 502 in the X direction (i.e., the lateral direction), which is orthogonal to the Y direction. The length of a region, in which the heating plate (heating member) 502 presses the sheet in the bonding process, in the longitudinal direction of the heating plate 502 is larger than the length of the region in the lateral direction, which is orthogonal to the longitudinal direction.

Figure 3C:
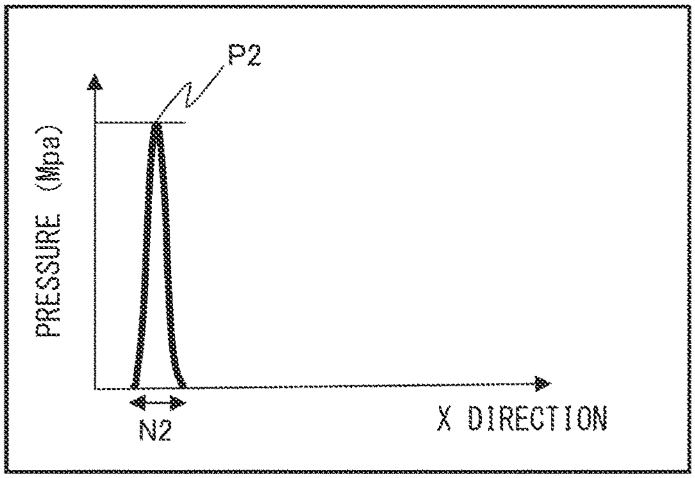
FIG. 3C is a diagram illustrating a distribution of pressure received by a sheet in a heat-and-pressure bonding unit of the embodiment.

FIG. 3C illustrates a pressure distribution of a center portion of the heat-and-pressure bonding unit 51, obtained when a sheet stack is pressed. The center portion of the heat-and-pressure bonding unit 51 is a portion formed in the Y direction, and the pressure distribution is a distribution obtained in the X direction. The pressure that the sheet receives in the bonding process, which is performed by the heat-and-pressure bonding unit (bonding portion) 51, is the magnitude of load (i.e., surface pressure) applied to a unit area of the sheet. The load is applied to the sheet in a direction orthogonal to the sheet surface, by the heat-and-pressure bonding unit 51 pressing the sheet. The pressure distribution was measured by using a pressure distribution measuring system (product name: PINCH) made by Nitta Corporation, like the pressure distribution in the fixing apparatus 6. In the example of the present embodiment, the peak value (i.e., a peak pressure P2) of the pressure of the heat-and-pressure bonding unit 51 in the X direction is 0.3 MPa. In addition, a pressure width N2 in the X direction is 2.0 mm, which is smaller than the nip width N1 (9.0 mm) of the fixing nip 6N. Note that not only the flat portion of the heating plate 502 but also one portion of the curved portions contacts the sheet. Thus, the pressure width N2 in the X direction is set at 2.0 mm, which is larger than the width of the flat portion.

Figure 5C:
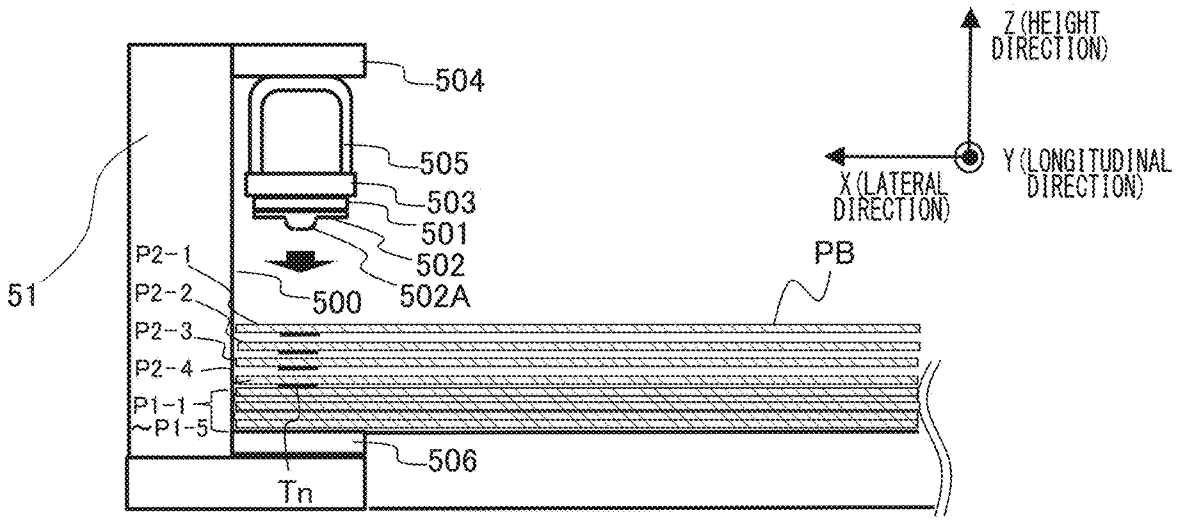
FIG. 5C is a diagram illustrating the configuration of the heat-and-pressure bonding unit of the embodiment.

As illustrated in FIG. 5C, the bonding process is first performed on a plurality of sheets (P1-1 to P1-5) by the heat-and-pressure bonding unit 51; then a plurality of other sheets (P2-1 to P2-4) is stacked on the plurality of sheets (P1-1 to P1-5); and then the bonding process is performed again on the plurality of sheets (P2-1 to P2-4). With these operations, a sheet stack (P1-1 to P1-5 and P2-1 to P2-4) that contains the plurality of preceding sheets bonded earlier and the plurality of following sheets stacked on the preceding sheets is produced as a single booklet. If a continuous operation in which the above-described operations are repeated is performed, a booklet product that contains more sheets can be produced.

In the present embodiment, five sheets P are supplied in the first bonding process and up to four sheets P are supplied in each of the following bonding processes, so that a booklet that contains up to 50 sheets can be produced. That is, four sheets (or five sheets in the first bonding process) can be bonded together in a single bonding process. In the continuous operation, the supply of the sheet P to the heat-and-pressure bonding unit 51, the descending operation of the heat-and-pressure bonding unit 51, the pressing operation of the heat-and-pressure bonding unit 51 (that is performed for two seconds), and the ascending operation of the heat-and-pressure bonding unit 51 are repeated, so that the booklet can be produced efficiently. Note that the number of sheets supplied in a single bonding process can be changed.

After the bonding process for a single booklet is completed, the sheet bundle is pushed out from the intermediate stacking portion 42 toward a sheet discharging outlet 45 (FIG. 1) in a −Y direction, by a bundle discharging guide (not illustrated) disposed in the binding portion 301. Specifically, the sheet bundle is pushed out by the bundle discharging guide pushing an edge portion of the sheet bundle in the Y direction. In the sheet discharging outlet 45, a bundle discharging roller 38 (FIG. 1) is disposed. When the leading edge of the sheet bundle passes through the bundle discharging roller 38 and reaches a position that is slightly separated from the bundle discharging roller 38, the bundle discharging guide stops and returns to a waiting position. The bundle discharging roller 38 receives the sheet bundle from the bundle discharging guide, and discharges the sheet bundle to the lower discharging tray 37.

Composition, Manufacturing Method, and Measurement Method of Toner

Next, the composition of the printing toner will be described. The printing toner may be a known toner used for forming an image on a recording medium in an electrophotographic system. Preferably, the printing toner is made by using a thermoplastic resin as binding resin. The thermoplastic resin is not limited to a specific resin. For example, the thermoplastic resin may be a resin, such as polyester resin, vinyl resin, acrylic resin, or styrene acrylic resin, that is used for the conventional printing toner. The thermoplastic resin may contain a plurality of types of the above-described resins. More preferably, the printing toner is made by using the styrene acrylic resin. In addition, the printing toner may contain coloring agent, magnetic material, charge control agent, wax, and external additive.

Next, the composition of the bonding toner will be described. In the present embodiment, the bonding toner Tn may contain a thermoplastic resin. The thermoplastic resin is not limited to a specific resin. For example, the thermoplastic resin may be a resin, such as polyester resin, vinyl resin, acrylic resin, styrene acrylic resin, polyethylene, polypropylene, polyolefin, ethylene-vinyl acetate copolymer resin, or ethylene-acrylic acid copolymer resin. The thermoplastic resin may contain a plurality of types of the above-described resins.

Preferably, the bonding toner Tn further contains wax. The wax may be a known wax, such as ester wax or hydrocarbon wax. The ester wax is an ester made from alcohol and acid, and the hydrocarbon wax is a wax such as paraffin wax.

The bonding toner Tn may contain coloring agent. The coloring agent may be a known coloring agent, such as a black coloring agent, a yellow coloring agent, a magenta coloring agent, or a cyan coloring agent. The content of the coloring agent in the bonding toner Tn is preferably equal to or smaller than 1.0 mass %, and more preferably, equal to or smaller than 0.1 mass %. The bonding toner Tn may contain magnetic material, charge control agent, and external additive.

For forming the bonding layer of the bonding toner Tn on a sheet by using the electrophotographic system, the weight average particle diameter of the bonding toner Tn is preferably equal to or larger than 5.0 μm and equal to or smaller than 30 μm, and more preferably, equal to or larger than 6.0 μm and equal to or smaller than 20 μm.

If a toner that is identical to the printing toner has the required bonding performance, the toner may be used as the bonding toner Tn.

Figure 6A:
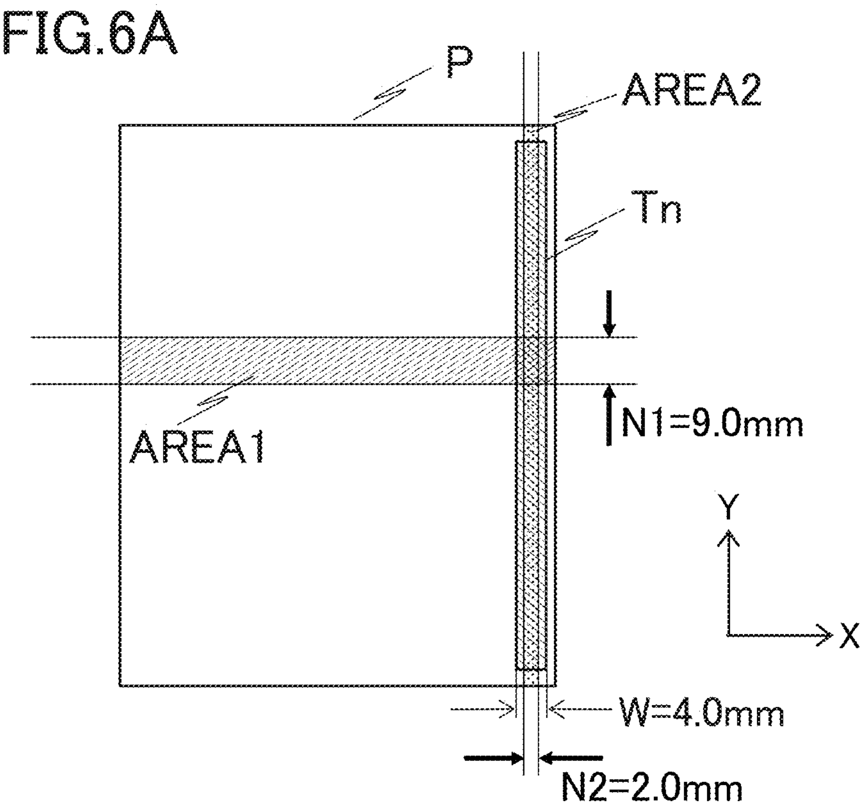
FIG. 6A is a diagram illustrating a region onto which bonding toner of the embodiment is applied.
Figure 6B:
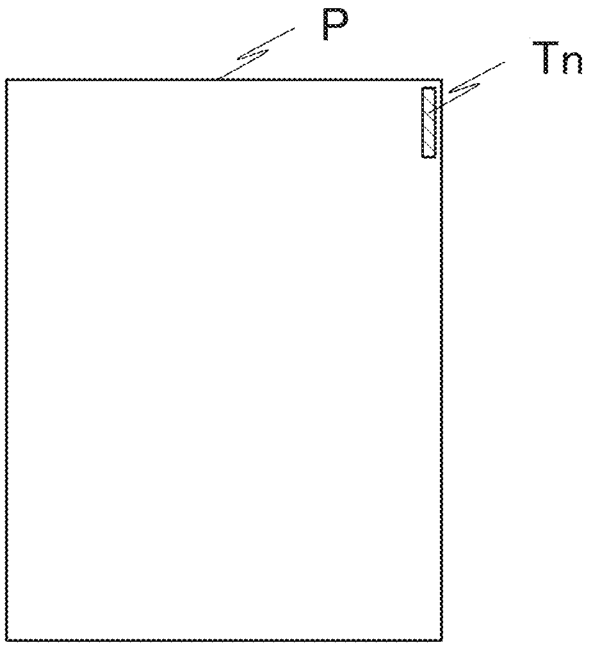
FIG. 6B is a diagram illustrating a region onto which bonding toner of the embodiment is applied.

FIG. 6A is a schematic diagram illustrating a region onto which the bonding toner Tn of the present embodiment is applied. As indicated by a hatched portion, the bonding toner Tn is applied onto an end region of the sheet P, which is formed along one long side of the sheet P. In this case, the booklet produced by the binding portion 301 performing the bonding process is a booklet in which the long-edge portions of the sheets are bound together (long-edge binding). For example, a width W of the region, onto which the bonding toner Tn is applied, is 4.0 mm. In addition, as illustrated in FIG. 6B, if the bonding toner Tn is applied onto a corner portion between a long side and a short side of the sheet P, a booklet in which the corner portions of the sheets are bound together (corner binding) can be produced.

In the present embodiment, the amount of the bonding toner Tn per unit area (i.e., the amount of toner applied onto a unit area of a sheet) is 0.55 $mg/cm^2$, for example. The amount of toner is measured after the secondary transfer process is performed and before the fixing process is performed. That is, the amount of toner is measured in a state where the toner is still not fixed to the sheet.

Next, an example of manufacturing the bonding toner Tn will be described.

styrene 75.0 pbw (parts by weight)
n-butyl acrylate 25.0 pbw
polyester resin 4.0 pbw
(The polyester resin has a weight-average molecular weight (Mw) of 20,000, a glass transition temperature (Tg) of 75° C., and an acid value of 8.2 mgKOH/g.)
ethylene glycol distearate 14.0 pbw
(The ethylene glycol distearate is an ester wax into which ethylene glycol and stearic acid are esterified.)
hydrocarbon wax (HNP-9 made by NIPPON SEIRO CO., LTD.) 2.0 pbw
divinylbenzene 0.5 pbw The above-described materials were mixed with each other. In a state where the temperature of the mixture was kept at 60° C., the mixture was uniformly dissolved by agitating the mixture at 500 rpm by using a T.K. homomixer (made by Tokushu Kika Kogyo Co., Ltd.), so that a polymerizable monomer composition was prepared.

On the other hand, 850.0 pbw of aqueous solution of 0.10 mol/L-$Na_3PO_4$ and 8.0 pbw of hydrochloric acid of 10% were put in a container provided with a high-speed stirrer, CLEARMIX (made by M Technique Co., Ltd.). The rotational speed of the high-speed stirrer was adjusted into 15,000 rpm, and the mixture was heated up to 70° C. Then, 127.5 pbw of aqueous solution of 1.0 mol/L-$CaCl_2$ was added to the mixture, so that a water-based medium that contains a calcium phosphate compound was prepared.

Then, the above-described polymerizable monomer composition was put in the water-based medium, and after that, 7.0 pbw of t-butyl peroxypivalate that serves as a polymerization initiator was added to the mixture. Then, the granulation was performed for ten minutes while the rotational speed of 15,000 rpm was kept. After that, the agitating machine was changed from the high-speed stirrer to a propeller impeller, and the mixture was caused to react at 70° C. for five hours, at reflux. Then, the temperature of the liquid was set at 85° C., and the mixture was further caused to react for two hours.

After the polymerization reaction was completed, the slurry obtained in this manner was cooled, and hydrochloric acid was added to the slurry so that the pH was 1.4. The slurry was agitated for one hour, so that the calcium phosphate salt was dissolved. After that, cleaning of the slurry was performed with water having a volume three times larger than that of the slurry. Then, filtering, drying, and classifying were performed, so that the bonding toner particles were obtained.

Then, 2.0 pbw of silica fine particles were added, as external additive, to 100.0 pbw of the bonding toner particles. The silica fine particles were produced by performing the hydrophobic treatment by using dimethyl silicone oil of 20 mass % (the number-average particle diameter of the primary particles was 10 nm, and the BET specific surface area was 170 $m^2/g$). The bonding toner particles and the silica fine particles were mixed with each other at 3,000 rpm for 15 minutes, by using a Mitsui Henschel mixer (made by Mitsui Miike Kakouki Ltd.), so that the bonding toner Tn was obtained. The weight average particle diameter of the bonding toner Tn obtained in this manner was 7.0 μm.

Next, an example of manufacturing the printing toner will be described.

styrene 60.0 pbw
coloring agent 6.5 pbw
(C.I.Pigment Blue 15:3 made by Dainichiseika Color & Chemicals Mfg. Co., Ltd.)

The above-described materials were put in an Atritor (made by Mitsui Miike Kakouki Ltd.). The mixture was dispersed by using zirconia particles having a diameter of 1.7 mm for five hours at 220 rpm, so that a pigment dispersion liquid was obtained.

styrene 15.0 pbw
n-butyl acrylate 25.0 pbw
polyester resin 4.0 pbw
(The polyester resin has a weight-average molecular weight (Mw) of 20,000, a glass transition temperature (Tg) of 75° C., and an acid value of 8.2 mgKOH/g.)
behenyl behenate 12.0 pbw
(The behenyl behenate is an ester wax produced by esterifying behenic acid and behenyl alcohol.)
divinylbenzene 0.5 pbw The above-described materials were mixed with each other, and the mixture was added to the pigment dispersion liquid. In a state where the temperature of the mixture obtained in this manner was kept at 60° C., the mixture was uniformly dissolved and dispersed by agitating the mixture at 500 rpm by using a T.K. homomixer (made by Tokushu Kika Kogyo Co., Ltd.), so that a polymerizable monomer composition was prepared.

On the other hand, 850.0 pbw of aqueous solution of 0.10 mol/L-$Na_3PO_4$ and 8.0 pbw of hydrochloric acid of 10% were put in a container provided with a high-speed stirrer, CLEARMIX (made by M Technique Co., Ltd.). The rotational speed of the high-speed stirrer was adjusted into 15,000 rpm, and the mixture was heated up to 70° C. Then, 127.5 pbw of aqueous solution of 1.0 mol/L-$CaCl_2$ was added to the mixture, so that a water-based medium that contains a calcium phosphate compound was prepared.

Then, the above-described polymerizable monomer composition was put in the water-based medium, and after that, 7.0 pbw of t-butyl peroxypivalate that serves as a polymerization initiator was added to the mixture. Then, the granulation was performed for ten minutes while the rotational speed of 15,000 rpm was kept. After that, the agitating machine was changed from the high-speed stirrer to a propeller impeller, and the mixture was caused to react at 70° C. for five hours, at reflux. Then, the temperature of the liquid was set at 85° C., and the mixture was further caused to react for two hours.

After the polymerization reaction was completed, the slurry obtained in this manner was cooled, and hydrochloric acid was added to the slurry so that the pH was 1.4. The slurry was agitated for one hour, so that the calcium phosphate salt was dissolved. After that, cleaning of the slurry was performed with water having a volume three times larger than that of the slurry. Then, filtering, drying, and classifying were performed, so that the toner particles were obtained.

Then, 2.0 pbw of silica fine particles were added, as external additive, to 100.0 pbw of the toner particles. The silica fine particles were produced by performing the hydrophobic treatment by using dimethyl silicone oil of 20 mass % (the number-average particle diameter of the primary particles was 10 nm, and the BET specific surface area was 170 $m^2/g$). The toner particles and the silica fine particles were mixed with each other at 3,000 rpm for 15 minutes, by using a Mitsui Henschel mixer (made by Mitsui Miike Kakouki Ltd.), so that the toner was obtained. The weight average particle diameter of the printing toner obtained in this manner was 7.0 μm.

The weight average particle diameter of the printing toner and the bonding toner Tn is calculated as below. The measuring instrument is a precise particle-size distribution measuring instrument, Coulter counter (registered trademark): Multisizer 3 (product name), made by Beckman Coulter, Inc. The measuring instrument includes an aperture tube having a size of 100 μm and performs the measurement by using a method of measuring the electrical resistance of microchannels. The setting of measurement conditions and the analysis of the measurement data are performed by using a dedicated software, Beckman Coulter Multisizer 3 Version 3.51 (made by Beckman Coulter, Inc.), that is supplied together with the measuring instrument. Note that the number of effective measurement channels in the measurement is 25,000.

The electrolyte aqueous solution used for the measurement can be obtained by dissolving the guaranteed sodium chloride in ion-exchanged water so that the concentration of the solution is 1 mass %. For example, the electrolyte aqueous solution may be a solution, ISOTON II, made by Beckman Coulter, Inc.

Note that before the measurement and the analysis, the setting of the dedicated software is performed as below.

In a screen "Change Standard Measurement Method (SOM)" of the dedicated software, the total number of counts in the control mode is set at 50,000 particles, the number of measurements is set at 1, and the Kd value is set at a value obtained by using the setting of "standard particles 10.0 μm". If a button "Measurement of Threshold/Noise Level" is pressed, the threshold and the noise level are automatically set. In addition, the current is set at 1,600 μA, the gain is set at 2, the electrolytic solution is set at ISOTON II, and an item "Flush Aperture Tube after Measurement" is checked. In a screen "Setting of Conversion from Pulse to Particle Diameter", "bin interval" is set at logarithmic particle diameter, "particle-diameter bins" is set at 256 particle-diameter bins, and "particle-diameter range" is set at a range from 2 to 60 μm.

A specific measurement method is as below.

(1) The electrolyte aqueous solution of 200 mL is put in a round-bottom glass beaker used exclusively for Multisizer 3 and having a capacity of 250 mL. The beaker is set on a sample stand, and the electrolyte aqueous solution is agitated at 24 rotations per second, counterclockwise, by using a stirrer rod. In addition, by using a function "Flush of Aperture Tube" of the dedicated software, dirt and air bubbles in the aperture tube are removed.

(2) The electrolyte aqueous solution of 30 mL is put in a flat-bottom glass beaker having a capacity of 100 mL. On the other hand, a dispersant is diluted three times in mass with ion-exchanged water. The dispersant is Contaminon N, made by Wako Pure Chemical Industries Ltd., which is an aqueous solution in which a neutral detergent for cleaning a precise measuring instrument is diluted in 10 mass % with water. The neutral detergent has a pH of 7, and is composed of nonionic surface active agent, anionic surface active agent, and organic builder. The diluted solution is added to the electrolyte solution, by 0.3 mL.

(3) An ultrasonic dispersion system, Ultrasonic Dispersion System Tetora 150 (made by Nikkaki Baiosu Corporation), is prepared. The system includes two oscillators which oscillate at an oscillating frequency of 50 kHz, and each of which outputs electric power of 120 W. The waveforms of oscillation of the oscillators are shifted from each other, by 180 degrees. An ion-exchanged water of 3.3 L is put in a tank of the ultrasonic dispersion system, and the Contaminon N is added, by 2 mL, to the ion-exchanged water in the tank.

(4) The beaker described in (2) is set in a beaker fixing hole of the above-described ultrasonic dispersion system, and the ultrasonic dispersion system is activated. Then, the position in height of the beaker is adjusted so that the resonance of the surface of the electrolyte aqueous solution contained in the beaker becomes maximum.

(5) In a state where the electrolyte aqueous solution contained in the beaker described in (4) is irradiated with the ultrasonic wave, the toner or the bonding toner Tn is added, little by little, to the electrolyte aqueous solution and dispersed until the mass of the toner or the bonding toner Tn in the electrolyte aqueous solution becomes 10 mg. After that, the toner or the bonding toner Tn is further dispersed by using the ultrasonic wave, for 60 seconds. Note that during the dispersion process by using the ultrasonic wave, the temperature of the water contained in the tank is adjusted as appropriate so that the temperature is in a range equal to or higher than 10° C. and equal to or lower than 40° C.

(6) The electrolyte aqueous solution described in (5) in which the toner or the bonding toner Tn has been dispersed is put, as a drop, into the round-bottom beaker, described in (1) and set on the sample stand, by using a pipet so that the measured concentration is 5%. The measurement is performed until the measured number of particles reaches 50,000.

(7) The measurement data is analyzed by using the dedicated software supplied together with the measuring instrument, and thereby the weight average particle diameter is calculated.

Measurement Method for Viscoelasticity of Toner

Next, a method of measuring a storage modulus of the toner will be described. The storage modulus represents the viscoelasticity of the toner. The storage modulus of the bonding toner Tn is measured by using a dynamic viscoelasticity measuring instrument (Rheometer), ARES, made by Rheometric Scientific, Inc.

Measurement jig: serrated parallel plates having a diameter of 7.9 mm.

Measurement sample: a cylindrical sample made by using a compression molding machine (the sample is pressed by a force of 15 kN for one minute at a room temperature) and having a mass of 0.1 g, a diameter of 8 mm, and a height of 2 mm. The compression molding machine used is a 100 kN-press NT-100H made by NPa SYSTEM CO., LTD.

The temperature of the serrated parallel plates is adjusted into 120° C., and the cylindrical sample is heated and melted so that the serrated parallel plates are engaged with the cylindrical sample. In addition, an axial force equal to or smaller than 30 gf (0.294 N) is applied in the vertical direction, so that the sample is fixed to the serrated parallel plates. Note that a steel belt may be used in the above-described operation so that the diameter of the sample becomes equal to the diameter of the parallel plates. The serrated parallel plates and the cylindrical sample are cooled gradually for one hour so that a measurement start temperature of 30.00° C. is reached.

Measurement frequency: 6.28 radian/second.

Setting of measurement strain: measurement in an automatic measurement mode, with an initial value of 0.1%.

Expansion correction of sample: adjustment performed in an automatic measurement mode.

Measurement temperature: 30 up to 140° C., which is increased at a rate of 2 degrees per minute.

Measurement interval: every 30 seconds (that is, the viscoelasticity data is measured every time the temperature increases by 1° C.).

Figure 7:
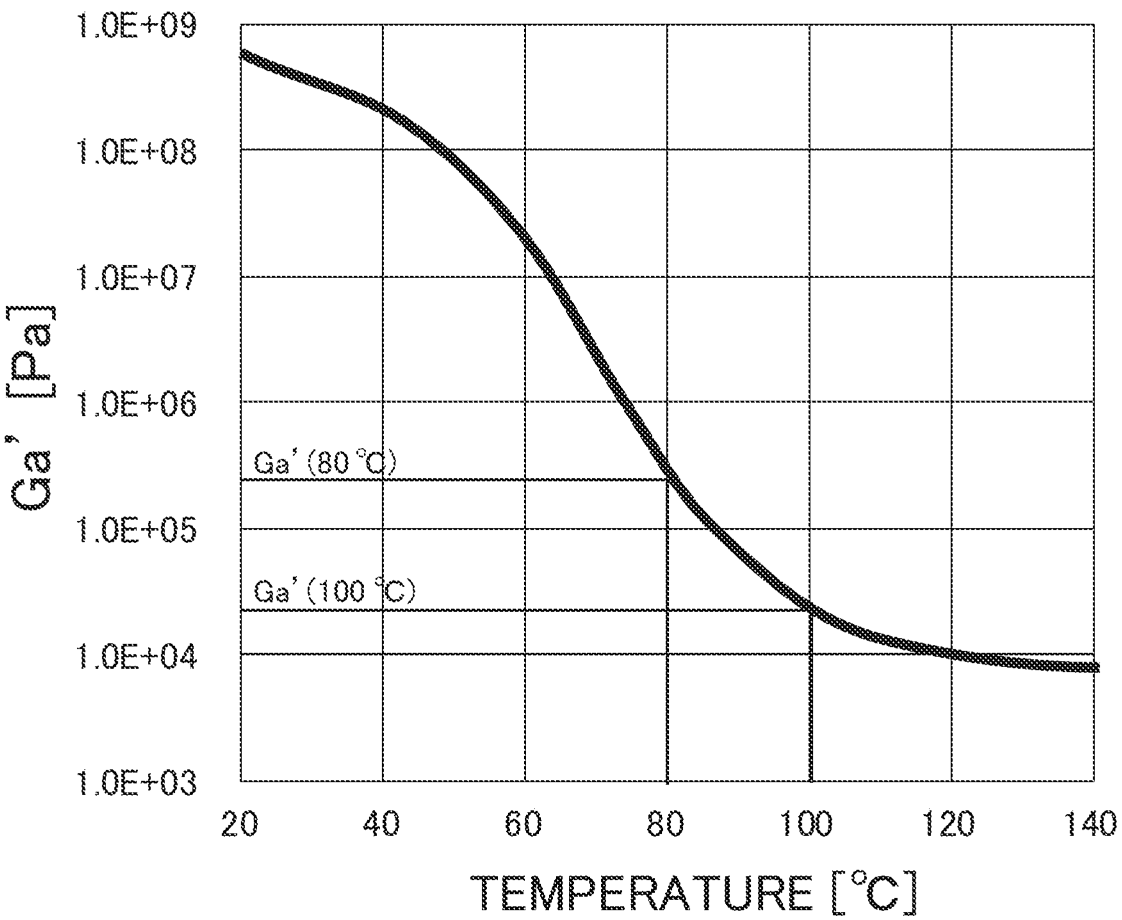
FIG. 7 is a diagram illustrating a measurement result of storage modulus of bonding toner of the embodiment.

FIG. 7 illustrates a measurement result of the storage modulus of the bonding toner Tn. As representative values, a storage modulus Ga' (100° C.) at 100° C. and a storage modulus Ga' (80° C.) at 80° C. were obtained. The storage modulus Ga' (100° C.) is $2.2\times10^4$ Pa, and the storage modulus Ga' (80° C.) is $3.2\times10^5$ Pa.

The storage modulus Ga' (100° C.) at 100° C. was obtained because the temperature of the bonding toner Tn on the sheet P increases to about 100° C. in the fixing process while the sheet P passes through the fixing nip 6N of the fixing apparatus 6. In addition, the storage modulus Ga' (80° C.) was obtained as a value that represents the property of the bonding toner Tn that is obtained in the bonding process. Specifically, when the heat-and-pressure bonding unit 51 performs the bonding process on a sheet stack, the minimum toner temperature obtained when the maximum number (i.e., five) of sheets are bonded together at one time is about 80° C. Thus, if the storage modulus of the powder adhesive (i.e., the bonding toner Tn) in the fixing process is denoted by G1 (Pa) and the storage modulus of the powder adhesive in the bonding process is denoted by G2 (Pa), $G1<G2$ is satisfied in the present embodiment.

As illustrated in FIG. 5A, in the present embodiment, the surface temperature of the heating plate 502 and the preset temperature of the temperature detection portion are set so that when the sheets, P1-1 to P1-5, are bonded together at one time, the toner temperature between the sheet P1-4 and the sheet P1-5 is equal to or higher than 80° C. In the present embodiment, the peak temperature of the powder adhesive that bonds the sheet P1-5, which is separated more from the heating member than any other sheets in the three or more sheets that are bonded together in a single bonding process, to another sheet is lower than the peak temperature of the powder adhesive obtained in the fixing process. In other words, if a first sheet is the most separated sheet (e.g., sheet P1-5) from the heating member in the three or more sheets that are bonded together in a single bonding process (i.e., one round of the bonding process), and a second sheet is a sheet (e.g., sheet P1-4) in the three or more sheets that is bonded to the first sheet with a layer of the powder adhesive, the peak temperature of the layer of the powder adhesive in the bonding process is lower than the peak temperature of the layer of the powder adhesive in the fixing process.

Comparative Experiments

Table 1 illustrates results of comparative experiments performed on a representative example (Example 1) of the present embodiment and other examples (Example 2 to Example 11). From the comparative experiments, the relationship between the setting and the booklet quality, which is the quality of a product produced by performing the bonding, was examined. The setting includes five items: (1) the sheet type, (2) the peak pressure in the fixing apparatus 6, (3) the film surface temperature in the fixing apparatus 6, (4) the peak pressure in the heat-and-pressure bonding unit 51, and (5) the heating-plate surface temperature in the heat-and-pressure bonding unit 51. In the examples in which the setting is different from each other, the quality: (1) the bonding strength, and (2) the yellowing was examined, as booklet quality.

Figure 8A:
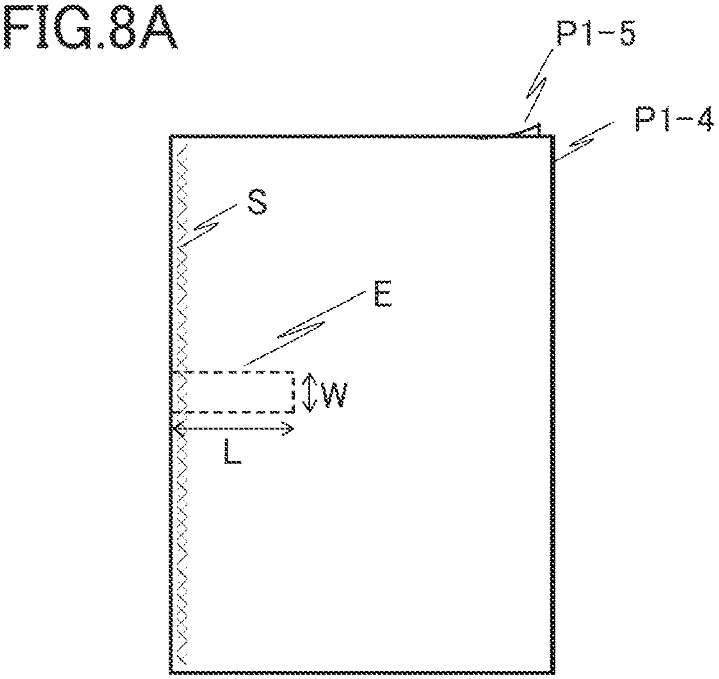
FIG. 8A is a diagram illustrating a method of testing the bonding strength between one sheet and another sheet of the embodiment.

Next, a booklet-quality test method for the bonding strength will be described with reference to a schematic diagram of FIGS. 8A and 8B. First, a booklet that includes five sheets, P1-1 to P1-5, as illustrated in FIG. 5A was produced by the image forming apparatus 1. That is, the booklet for the strength test was produced in a single bonding process by the heat-and-pressure bonding unit 51. Then, three sheets, P1-1 to P1-3, were removed from the booklet by peeling the sheets from the booklet, so that the booklet is constituted by the two sheets, P1-4 and P1-5, bonded to each other. After that, the booklet constituted by the two sheets, P1-4 and P1-5, was cut as illustrated in FIG. 8A; and a test piece E having a width (W) of 20 mm and a length (L) of 50 mm and including a bonded portion S was made.

Figure 8B:
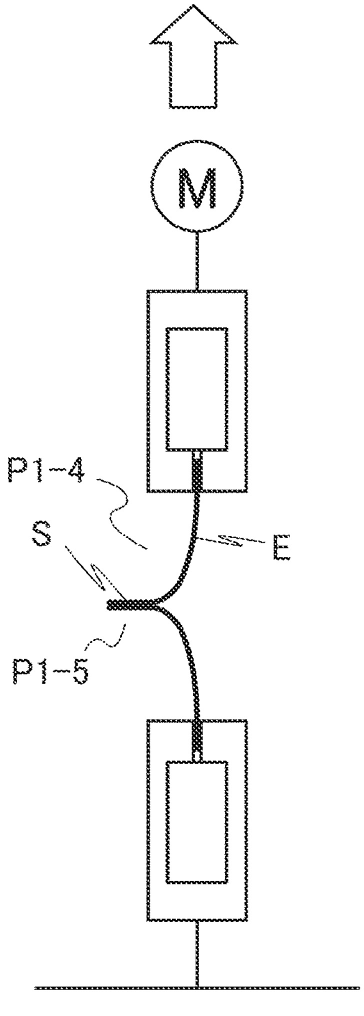
FIG. 8B is a diagram illustrating the method of testing the bonding strength between one sheet and another sheet of the embodiment.

Then, as illustrated in FIG. 8B, the one sheet P-4 of the test piece E was held by a holding member disposed above the test piece E, and the other sheet P1-5 was held by another holding member disposed below the test piece E. The upper holding member was connected to a digital force gauge M (that is an FGP-2 made by NIDEC-SHIMPO CORPORATION). The digital force gauge was gradually lifted upward, and when the bonded portion S was peeled off, the peel force was measured by the digital force gauge and the peak value of the peel force was recorded. The measurement was repeated five times, and an average value was determined as the bonding strength of the bonded portion S.

The present inventors confirmed that it is practically desirable that the bonding strength of booklets be equal to or larger than 1.0 N/cm. The value represents the bonding strength of the test piece E, obtained per unit distance in the width direction of the test piece E. Thus, the quality standard was determined as follows. That is, the quality was determined as rank "A" if the bonding strength was equal to or larger than 1.0 N/cm, and determined as rank "B" if the bonding strength was smaller than 1.0 N/cm. The rank "A" is preferable to the rank "B". As described above, the bonding strength between the sheet P1-4 and the sheet P1-5 of the five sheets of the original booklet was measured. This is because the bonded portion is separated more from the heating plate 502 than any other bonded portions, and thus is required to have higher bonding strength since it is difficult to supply the sufficient heat to the bonded portion. The sheet P1-5 is an example of the lowermost sheet of the three or more sheets that can be bonded together in a single bonding process. The sheet P1-4 is an example of a sheet that is stacked on the lowermost sheet.

The yellowing in the booklet quality occurs if the sheet P is overheated. For example, if a portion of the uppermost sheet P1-1 that is illustrated in FIG. 5A and that directly contacts the heating plate 502 is supplied with an excessive amount of heat, and the temperature of the uppermost sheet P1-1 increases locally, the sheet P1-1 may change in quality, and the color of the sheet P1-1 may be changed (yellowed), deteriorating the booklet quality. In the comparative experiments, the quality was determined as rank "A" if the sheet was not yellowed in a visual test, and determined as rank "B" if the sheet was yellowed in the visual test. The rank "A" is preferable to the rank "B".

The sheets for evaluation are the following two types of paper sheets.

(1) Vitality90

Product name: Vitality Multipurpose Printer Paper
Maker: Xerox Corporation
Grammage: 90 g/m$^2$
Size: LTR (279×216 mm)
Bekk smoothness: 25 seconds (2) HammerMill90

Product name: HammerMill Laser Print
Maker: International Paper Company
Grammage: 90 g/m$^2$
Size: LTR (279×216 mm)
Bekk smoothness: 100 seconds The two types of paper sheets for evaluation are significantly different from each other in smoothness. The paper sheets of HammerMill90 are higher in smoothness than the paper sheets of Vitality90. Specifically, the Bekk smoothness of the paper sheets of Vitality90 is smaller than the Bekk smoothness of the paper sheets of HammerMill90. The Bekk smoothness is an indicator of the smoothness. Specifically, the Bekk smoothness is an indicator of smoothness, defined by ISO 5627: 1995 and JIS P 8119. The Bekk smoothness is measured as below. First, a pressure of 0.1 MPa is applied from above. Then, an air pressure is reduced to half the atmospheric pressure by using a vacuum pump, and after that, the time in which an air of 10 cc flows in though the gap between the surface of a measurement sample and the surface of a glass plate is measured. The distance of the path of the air is 13 mm. In the present embodiment, the Bekk smoothness of the above-described two types of sheets was measured by using a Bekk smoothness tester made by KUMAGAI RIKI KOGYO Co., Ltd.

The measurement results of the comparative experiments will be described with reference to Table 1.

(i.e., 1.2 N/cm) was substantially equal to the bonding strength of Example 1 even though the peak pressure P2 of Example 4 is higher than the peak pressure P2 of Example 1.

TABLE 1

| | SETTING | | | | | BOOKLET QUALITY | |
|---|---|---|---|---|---|---|---|
| | 1 | 2 | 3 | 4 | 5 | | |
| | | FIXING APPARATUS | | HEAT-AND-PRESSURE BONDING UNIT | | | |
| | SHEET (BEKK SMOOTHNESS) | PEAK PRESSURE P1 | FILM SURFACE TEMPERATURE | PEAK PRESSURE P2 | HEATING-PLATE SURFACE TEMPERATURE | 1 BONDING STRENGTH | 2 YELLOWING |
| EXAMPLE 1 | Vitality90 (25 sec) | 0.2 MPa | 175° C. | 0.3 MPa | 200° C. | A (1.2 N/cm) | A |
| EXAMPLE 2 | Vitality90 (25 sec) | 0.2 MPa | 175° C. | 0.1 MPa | 200° C. | B (0.3 N/cm) | A |
| EXAMPLE 3 | Vitality90 (25 sec) | 0.2 MPa | 175° C. | 0.2 MPa | 200° C. | B (0.6 N/cm) | A |
| EXAMPLE 4 | Vitality90 (25 sec) | 0.2 MPa | 175° C. | 0.4 MPa | 200° C. | A (1.2 N/cm) | A |
| EXAMPLE 5 | Vitality90 (25 sec) | 0.3 MPa | 175° C. | 0.3 MPa | 200° C. | B (0.7 N/cm) | A |
| EXAMPLE 6 | Vitality90 (25 sec) | 0.2 MPa | 175° C. | 0.2 MPa | 210° C. | A (1.2 N/cm) | B |
| EXAMPLE 7 | HammerMill90 (100 sec) | 0.1 MPa | 175° C. | 0.1 MPa | 200° C. | B (0.7 N/cm) | A |
| EXAMPLE 8 | HammerMill90 (100 sec) | 0.1 MPa | 175° C. | 0.2 MPa | 200° C. | A (1.5 N/cm) | A |
| EXAMPLE 9 | HammerMill90 (100 sec) | 0.1 MPa | 175° C. | 0.3 MPa | 200° C. | A (1.5 N/cm) | A |
| EXAMPLE 10 | HammerMill90 (100 sec) | 0.1 MPa | 175° C. | 0.4 MPa | 200° C. | A (1.5 N/cm) | A |
| EXAMPLE 11 | HammerMill90 (100 sec) | 0.2 MPa | 175° C. | 0.3 MPa | 200° C. | A (1.2 N/cm) | A |

Example 1

In Example 1 to Example 6, the experiment was performed by using Vitality90 whose surface is relatively rough. In Example 1, the peak value of the pressure received by the sheet in the fixing process (i.e., the peak pressure P1 in the fixing process) was set at 0.2 MPa, and the surface temperature of the fixing film 6*a* was set at 175° C. In addition, the peak value of the pressure received by the sheet in the bonding process (i.e., the peak pressure P2 in the bonding process) was set at 0.3 MPa, and the surface temperature of the heating plate 502 was set at 200° C. In this setting, a sufficient bonding strength of 1.2 N/cm was obtained (rank A), and the yellowing did not occur (rank A). That is, in the setting of Example 1, sufficient booklet quality can be achieved even though the sheets whose surfaces are relatively rough are used.

Example 2 to Example 4

In Example 2 to Example 4, the peak pressure P2 in the bonding process was changed from the peak pressure of Example 1. In Example 3, the peak pressure P2 in the bonding process is substantially equal to the peak pressure P1 in the fixing process. In this example, the bonding strength decreased from the bonding strength of Example 1 (rank B). In Example 2 in which the peak pressure P2 is lower than the peak pressure P1, the bonding strength further decreased (rank B). In contrast, in Example 4 in which the peak pressure P2 in the bonding process is higher than the peak pressure P1 in the fixing process, the bonding strength It is understood from the experiments that the peak pressure P2 in the bonding process is required to be higher than the peak pressure P1 in the fixing process for ensuring the sufficient bonding strength, and that the peak pressure P2 is not required to have an excessively high value.

Example 5

In Example 5, the peak pressure P1 in the fixing process was made higher than the peak pressure P1 of Example 1, and the peak pressure P2 in the bonding process was made substantially equal to the peak pressure P2 in the fixing process. In Example 5, the bonding strength decreased from the bonding strength of Example 1 (rank B).

Figure 9:
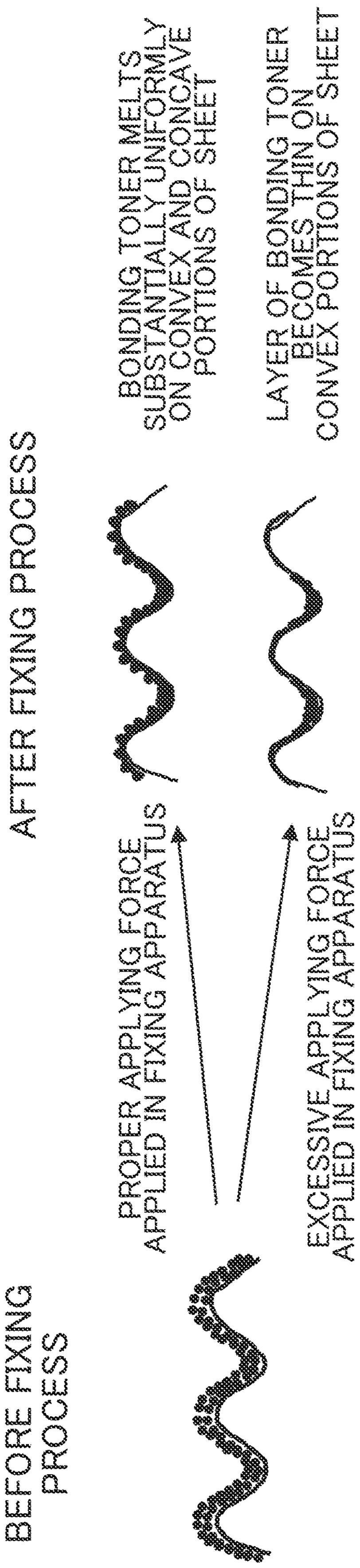
FIG. 9 is a diagram for illustrating a state of bonding toner obtained before a fixing process, and a state of the bonding toner obtained after the fixing process.

The present inventors have studied the reason. As illustrated in FIG. 9, in Example 5 in which the peak pressure P1 in the fixing process has a higher value, the bonding toner is caused to excessively permeate the sheet (as illustrated in a lower right portion of FIG. 9) by the heat and pressure applied in a period of time from when the fixing process is still not performed (as illustrated in a left portion of FIG. 9) until when the fixing process is completed. In contrast, in a case where the peak pressure P1 of Example 1 was applied in the fixing process, it was confirmed from the observation that the bonding toner is caused to melt substantially uniformly by the heat and pressure applied in the fixing process. Thus, it can be conceived that if the peak pressure P1 in the fixing process has an excessively high value, the layer (i.e., the bonding layer) of the bonding toner is made thin at protruding portions of the protruding and recess portions (unevenness) of the sheet surface. As a result, the bonding area is reduced actually, lowering the bonding strength.

Example 6

In Example 6, the peak pressure P2 in the bonding process was made lower than the peak pressure P2 of Example 1, and made substantially equal to the peak pressure P1 in the fixing process; and the surface temperature of the heating plate 502 was set higher than the surface temperature of the heating plate 502 of Example 1. If the peak pressure P2 in the bonding process is merely decreased, the bonding strength decreases as in Example 3. In this example, since the heating temperature in the bonding process was increased, the bonding strength increased (rank A). However, since the heating temperature in the bonding process was increased, the outermost surface (P1-1) of the sheet stack was overheated and changed in quality, so that the booklet was yellowed (rank B).

Thus, it is understood that in a method that increases the heating temperature in the bonding process, the quality of sheets may change caused by overheating even if the sufficient bonding strength can be ensured.

Example 7 to Example 10

In Example 7 to Example 10, the experiment was performed by using HammerMill90 whose smoothness is higher than that of Vitality90, and the results of the experiments are illustrated in Table 1. If the sheets, such as HammerMill90, that have higher smoothness are used, the printing toner can be sufficiently fixed to the sheets even when the peak pressure P1 in the fixing process is set slightly lower.

Thus, in Example 7 to Example 10, the peak pressure P1 in the fixing process was set at 0.1 MPa, which is lower than the peak pressure P1 of Example 1, and the peak pressure P2 in the bonding process was changed in a range from 0.1 to 0.4 MPa. As a result, in Example 8 to Example 10 in which the peak pressure P2 is higher than the peak pressure P1, a sufficient bonding strength was obtained (rank A). However, in Example 7 in which the peak pressure P2 is substantially equal to the peak pressure P1, the bonding strength decreased (rank B). Note that in Example 7 to Example 10, the heating temperature in the fixing process and the heating temperature in the bonding process are equal to those of Example 1, and the booklet was not yellowed (rank A).

Example 11

In Example 11, the setting is the same as that of Example 1, except that the sheets are HammerMill90, not Vitality90. That is, in Example 11, the peak pressure P2 in the bonding process is higher than the peak pressure P1 in the fixing process. In addition, in Example 11, the peak pressure P1 in the fixing process is higher than the peak pressure P1 of Example 7 to Example 10.

In Example 11, although a sufficient bonding strength was obtained (rank A), the bonding strength decreased slightly, compared to the bonding strength of Example 7 to Example 10. Thus, it can be considered that if the sheets are HammerMill90 having higher smoothness, higher bonding strength is obtained by setting a lower peak pressure P1 in the fixing process. This is because if the lower peak pressure P1 is set in the fixing process, the permeation of the bonding toner into the sheet is reduced in the fixing process. However, even in Example 11, the bonding strength is sufficient in practice. In addition, in Example 11, the booklet was not yellowed (rank A).

From the experimental results of Example 1 to Example 11, it is preferable that the peak pressure P2 in the bonding process be equal to or higher than 0.3 MPa, for example. In addition, it is preferable that the surface temperature of the heating plate (heating member) 502 be equal to or lower than 200° C., for example. In addition, it is preferable that the peak pressure P1 in the fixing process be equal to or higher than 0.1 MPa and equal to or lower than 0.2 MPa, and that the peak pressure P2 in the bonding process be equal to or higher than 0.3 MPa and equal to or lower than 0.4 MPa. In addition, it is preferable that the surface temperature of the fixing film (rotary heating member) 6*a* in the fixing process be lower than the surface temperature of the heating member in the bonding process, and that the surface temperature of the heating plate (heating member) 502 in the bonding process be equal to or lower than 200° C.

Close-Contact Property in Fixing Process and Bonding Process

Figure 10A:
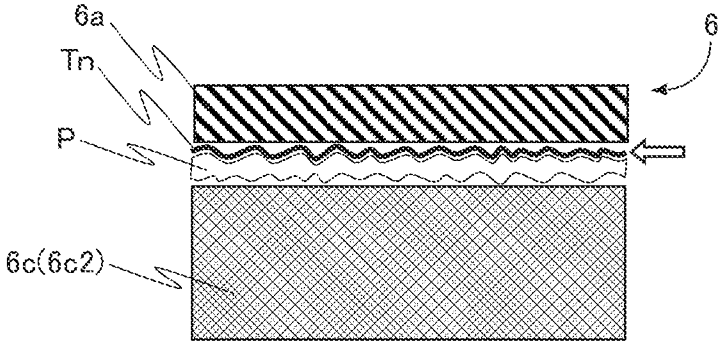
FIG. 10A is a schematic diagram illustrating a cross section of the fixing apparatus of the embodiment.
Figure 10B:
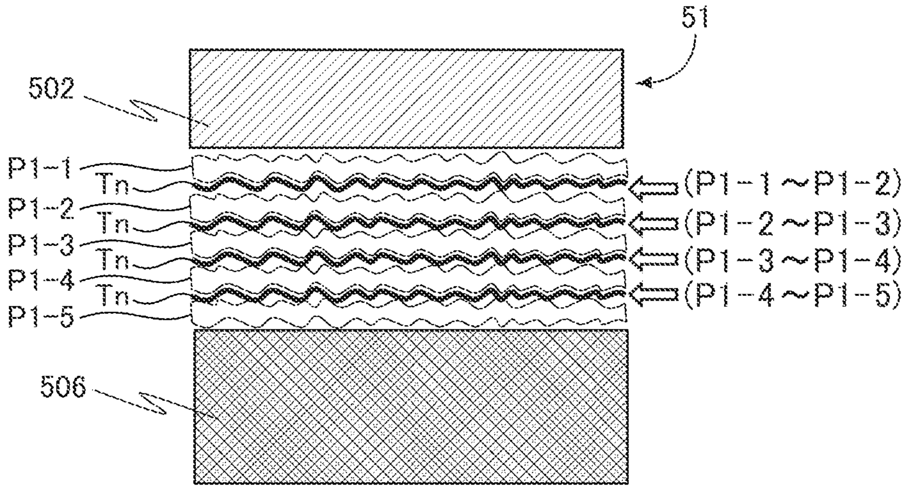
FIG. 10B is a schematic diagram illustrating a cross section of the heat-and-pressure bonding unit of the embodiment.

Thus, it is understood from the experimental results of Example 1 to Example 11 that if the peak pressure P2 received by the sheet in the bonding process is set higher than the peak pressure P1 received by the sheet in the fixing process (P1<P2), a sufficient bonding strength can be obtained. The mechanism of this will be described with reference to a schematic diagram of FIGS. 10A and 10B. FIG. 10A is a schematic diagram illustrating a cross section of the fixing nip 6N, obtained in the fixing process; and FIG. 10B is a schematic diagram illustrating a cross section of the heat-and-pressure bonding unit 51, obtained in the bonding process.

As illustrated in FIG. 10A, in the fixing apparatus 6, the sheets P are conveyed to the fixing nip 6N, one by one, and heated and pressed in the fixing nip 6N, in the fixing process. As illustrated in FIG. 10B, in the heat-and-pressure bonding unit 51, the bonding process is performed such that the sheets are heated, while pressed, by the heating plate 502 in a state where the sheets are stacked on each other.

Note that the sheet P and the bonding toner Tn in the fixing process are the same as the sheet P and the bonding toner Tn in the bonding process. In the fixing process, the sheet P is sandwiched between a partner member (i.e., an upper member) that contacts the sheet P via the bonding toner Tn, and a member (i.e., a lower member) that receives the force applied by the upper member, and is pressed. Also in the bonding process, a sheet P is sandwiched between a partner member (i.e., an upper member) that contacts the sheet P via the bonding toner Tn, and a member (i.e., a lower member) that receives the force applied by the upper member, and is pressed. In the present embodiment, the upper member in the fixing process is the fixing film 6*a*, and the lower member in the fixing process is the pressing roller 6*c*. In addition, in the present embodiment, the upper member in the bonding process is the heating plate 502, and the lower member in the bonding process is the pressing plate 506.

However, the condition under which the heating and the pressing are performed in the fixing process is different from the condition under which the heating and the pressing are performed in the bonding process. Specifically, the degree of close contact (indicated by a white arrow) between the surface of the sheet P, on which the layer (bonding layer) of the bonding toner Tn is formed, and the partner member (i.e., the upper member) is different between the fixing process and the bonding process. The difference in the degree of close contact between the sheet P and the upper member is related to a preferable difference in value between the peak pressure P1 in the fixing process and the peak pressure P2 in the bonding process.

That is, in the fixing apparatus 6, the close-contact property between the fixing film 6*a* and the sheet P is important for the fixing process. If the fixing film 6*a* and the sheet P are not in close contact with each other, the toner may not sufficiently be fixed to the sheet P. On the other hand, in the heat-and-pressure bonding unit 51, the close-contact property between one sheet P and another sheet P adjacent to each other is particularly important for the bonding process. If one sheet P and another sheet P adjacent to each other are not in close contact with each other, the bonding strength may be lowered.

Table 2 illustrates parameters related to the close-contact property obtained in the fixing process and the bonding process. The parameters related to the close-contact property obtained in the fixing process are as follows: the surface roughness and the hardness (Young's modulus) of the fixing film 6*a*, which serves as the upper member; the surface roughness and the hardness (Young's modulus) of the pressing roller 6*c*, which serves as the lower member; and the hardness of the bonding toner on the sheet P. The surface roughness and the hardness of the fixing film 6*a*, and the surface roughness and the hardness of the pressing roller 6*c* are actual measurement values. Since the hardness of the pressing roller 6*c* is mainly affected by the hardness of the elastic layer 6*c*2, the hardness of the pressing roller 6*c* illustrated in Table 2 is the hardness of the elastic layer 6*c*2. The hardness of the bonding toner illustrated in Table 2 is the storage modulus Ga' (100° C.).

The parameters related to the close-contact property obtained in the bonding process are determined, based on a bonded portion between the sheet P1-4 and the sheet P1-5, which are separated more from the heating plate 502 than any other sheets. That is, the parameters are determined based on the bonded portion, because ensuring the bonding strength of the bonded portion is especially difficult. The parameters related to the close-contact property obtained in the bonding process are as follows: the surface roughness and the hardness (Young's modulus) of the sheet P (Vitality90 in the present embodiment), which serves as an upper member; the surface roughness and the hardness (Young's modulus) of the pressing plate 506, which serves as the lower member; and the hardness of the bonding toner on the sheet P. The surface roughness and the hardness of the sheet P, and the surface roughness and the hardness of the pressing plate 506 are actual measurement values. The hardness of the bonding toner illustrated in Table 2 is the storage modulus Ga' (80° C.).

The close-contact property increases as the surface roughness and the hardness of each member related to the close-contact property obtained in the fixing process and the bonding process decrease. Note that the surface roughness of the bonding toner is not illustrated in Table 2 because when the bonding toner is heated in the fixing process and the bonding process, the bonding toner melts and the state of the bonding toner changes.

TABLE 2

| | FIXING PROCESS | | | BONDING PROCESS | | |
|---|---|---|---|---|---|---|
| | MEMBER | SURFACE ROUGHNESS Ra | HARDNESS (Ga') | MEMBER | SURFACE ROUGHNESS Ra | HARDNESS (Ga') |
| UPPER MEMBER | FIXING FILM | 0.4 μm | 5000 MPa | Vitality90 | 3.1 μm | 5000 MPa |
| TONER | BONDING TONER | — | 2.2E+4 Pa | BONDING TONER | — | 3.2E+5 Pa |
| LOWER MEMBER | PRESSING ROLLER | 0.4 μm | 0.2 MPa | PRESSING PLATE | 0.4 μm | 0.2 MPa |

In general, as illustrated in Table 2, the surface of the sheet is rougher than the surface of the fixing film 6*a* (that is a rotary member for the heating in the heat fixing system). Thus, the close-contact property in the bonding process becomes lower than the close-contact property in the fixing process. In addition, as illustrated in FIG. 10A, in the fixing process, the bonding toner directly contacts the fixing film 6*a* (that is a rotary member for the heating); in the bonding process, however, the heat from the heating plate 502 is transmitted to the bonding toner through other sheets, as illustrated in FIG. 10B. Thus, since the heat is less transmitted to the bonding toner, the bonding toner is less melted (softened). This is one factor that makes the close-contact property obtained in the bonding process, lower than the close-contact property obtained in the fixing process.

For this reason, it is preferable to increase the close-contact property (between one sheet and another sheet via the bonding toner) obtained in the bonding process, which is performed under less advantageous conditions than the conditions under which the fixing process is performed, by making the peak pressure P2 obtained in the bonding process, higher than the peak pressure P1 obtained in the fixing process, as in the present embodiment. With this operation, the bonding strength between the sheets can be increased.

In particular, in a case where the bonding process is performed, as in the present embodiment, on three or more sheets P (up to five sheets in the present embodiment) stacked on each other, the close-contact property between the sheet P1-4 and the sheet P1-5, separated more from the heating plate 502 than any other sheets, tends to decrease. As illustrated in Table 2, the temperature of the bonding toner between the sheet P1-4 and the sheet P1-5, obtained in the bonding process, was lower than the temperature of the bonding toner obtained in the fixing process. That is, the bonding toner in the bonding process was harder than the bonding toner in the fixing process. In such a case, it is especially desirable that the close-contact property in the bonding process be increased by making the peak pressure P2 obtained in the bonding process, higher than the peak pressure P1 obtained in the fixing process.

As described above, although the bonding strength may be increased by increasing the heating temperature in the bonding process, the color of the sheet may be changed (yellowing) due to overheating. In the present embodiment, however, since the bonding strength can be increased without increasing the risk of changing the color of the sheet, a product produced by performing the bonding and having good quality can be obtained.

In addition, it is understood from the results of the comparative experiments of Example 1 and Example 4, and from the results of the comparative experiments of Example 8 to Example 10 that if the peak pressure P2 in the bonding process is higher than the peak pressure P1 in the fixing process, a sufficient bonding strength can be ensured without excessively increasing the peak pressure P2 in the bonding process. As a result, the need for upsizing components of the heat-and-pressure bonding unit 51 or making the components with a high-strength material for allowing the heat-and-pressure bonding unit 51 to withstand an excessively higher peak pressure P2 is eliminated. Consequently, a product produced by performing the bonding and having good quality can be obtained while the upsizing of the apparatus and the increase in cost are suppressed.

As described above, in the present embodiment, the lateral width (N2) of the region in which the heating plate (heating member) 502 presses the sheet in the bonding process is smaller than the nip width N1 of the fixing nip 6N (N1>N2), which is measured in the sheet conveyance direction. Thus, the peak pressure P2 in the bonding process is made higher than the peak pressure P1 in the fixing process, so that the bonding strength can be made larger in the bonding process while the pressing force (the total pressure) applied to the whole of the heating plate 502 can be prevented from increasing. Consequently, the upsizing of the apparatus and the increase in cost can be suppressed.

As described above, in the present embodiment, the area of the region in which the heating plate (heating member) 502 presses the sheet in the bonding process (illustrated in FIG. 6A as AREA2) is made smaller than the area of the fixing nip 6N (illustrated in FIG. 6A as AREA1). Thus, the peak pressure P2 in the bonding process is made higher than the peak pressure P1 in the fixing process, so that the bonding strength can be made larger in the bonding process while the pressing force (the total pressure) applied to the whole of the heating plate 502 can be prevented from increasing. Consequently, the upsizing of the apparatus and the increase in cost can be suppressed. Note that the area of the region in which the heating plate 502 presses the sheet is the area of a portion of the sheet in which the pressing force applied by the heating plate 502 is observed by using the above-described measuring system (product name: PINCH). In the present embodiment, since the heating plate 502 is longer than the long side of the sheet, the area of the region in which the heating plate 502 presses the sheet is a product of the above-described lateral width (N2) and the length of the long side of the sheet. Similarly, the area of the fixing nip 6N is the area of a portion of the sheet in which the pressing force applied by the nip forming member disposed inside the fixing film 6*a* is observed by using the above-described measuring system.

Note that in the present embodiment, Vitality90 is used as an example of sheets whose surfaces are relatively rough, and the description has been made, with the setting of Example 1 of Table 1 being regarded as a typical example, for dealing with a variety of types of sheets. The setting of Example 1 is suitable for dealing with sheets whose Bekk smoothness is equal to or smaller than 25 seconds. However, the setting is not limited to this. For example, the setting can be changed as appropriate in accordance with a type of sheets on which the image forming apparatus can perform the bonding process. For example, if the image forming apparatus uses only the sheets having good surface property or high smoothness, the peak pressure P1 in the fixing process and the peak pressure P2 in the bonding process may be decreased, as described for Example 8. Decreasing the peak pressures P1 and P2 is advantageous for suppressing the upsizing of the apparatus and the increase in cost because the mechanical strength required for the fixing apparatus 6 and the heat-and-pressure bonding unit 51 can be made lower.

In addition, the peak pressures P1 and P2 may be controlled so as to be changed in accordance with a type of sheets. In this case, the pressing force (i.e., the total pressure) applied in the fixing nip 6N may be changed in the fixing apparatus 6, or in another case, the pressing force (i.e., the total pressure) applied in the bonding process may be changed in the heat-and-pressure bonding unit 51. For example, the setting of Example 8 may be used in a case where a single image forming apparatus uses HammerMill90 or other sheets whose smoothness is substantially equal to the smoothness of HammerMill90, and the setting of Example 1 may be used in a case where the single image forming apparatus uses Vitality90 or other sheets whose smoothness is substantially equal to the smoothness of Vitality90.

Other Examples

Figure 11:
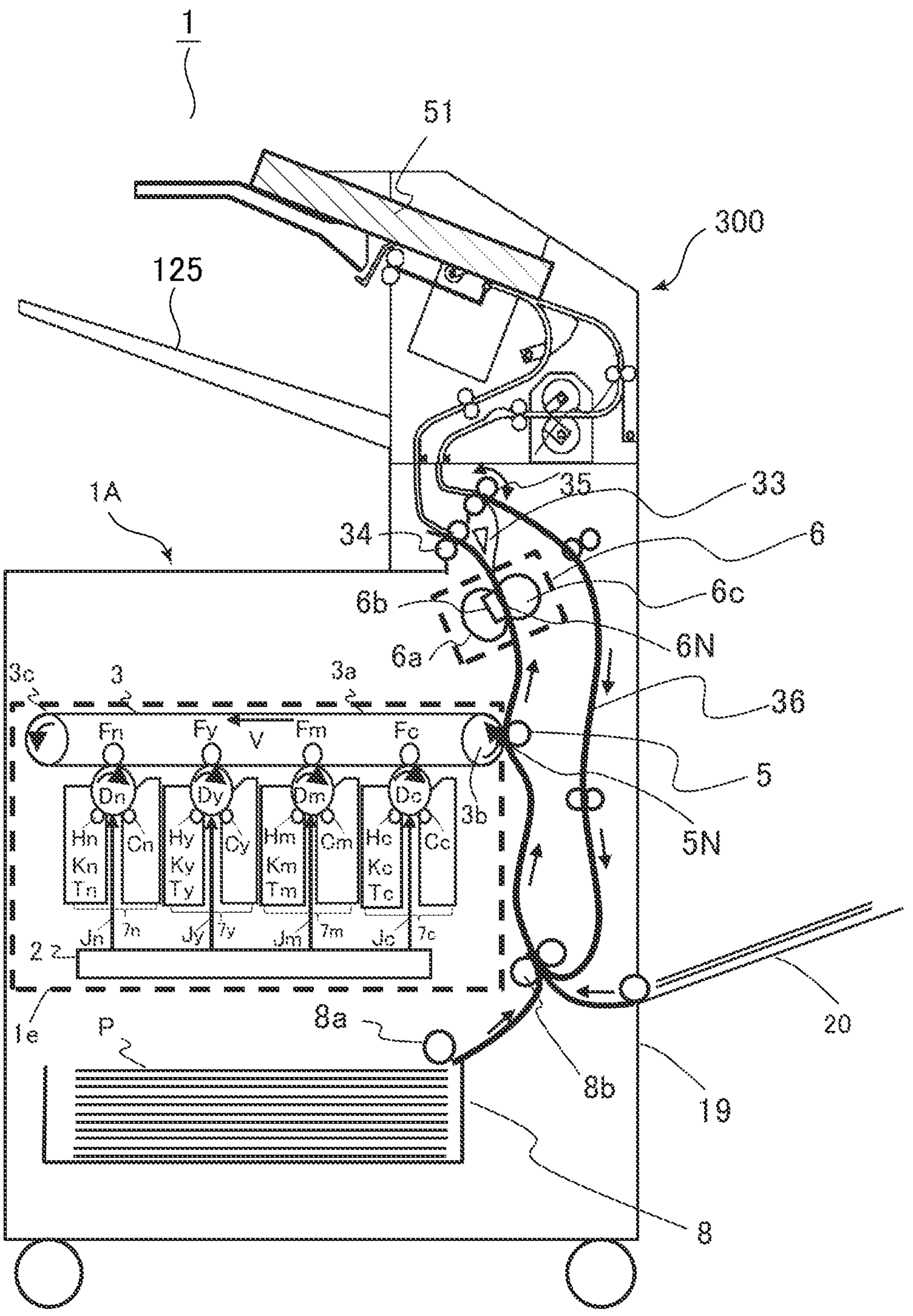
FIG. 11 is a schematic diagram of an image forming apparatus of another embodiment.

In the above-described embodiments, the description has been made, as an example, for the image forming apparatus 1 in which the post-process apparatus 300 including the heat-and-pressure bonding unit 51 is disposed adjacent to the image forming apparatus body 1A in a horizontal direction. The present disclosure, however, is not limited to this. For example, as illustrated in FIG. 11, the post-process apparatus 300 including the heat-and-pressure bonding unit 51 may be disposed above the image forming apparatus body 1A. In this configuration, the image forming apparatus including the bonding function can be disposed in a projected area viewed from above, which is substantially equal to the projected area of the image forming apparatus body 1A, viewed from above. Note that a product produced by performing the bonding by the heat-and-pressure bonding unit 51 can be stacked on a discharging tray 125 disposed above the image forming apparatus body 1A (i.e., above the image forming unit 1*e*).

In addition, this technique may be applied to an image forming apparatus in which the binding portion 301 and the image forming unit 1*e* are disposed in a single housing. In addition, since the image forming unit 1*e* is merely an example of the image forming portion, the image forming unit 1*e* may be replaced with another unit. For example, the other unit may be a plurality of process units with a direct-transfer system that form an image of the printing toner and an image of the bonding toner (i.e., a bonding layer).

In addition, although FIGS. 5A and 5C and FIGS. 10A and 10B illustrate an example in which the bonding toner is applied onto one side of a sheet to be bonded, the bonding toner may be applied onto both sides of a sheet to be bonded. In this case, the bonding toner may be applied onto a predetermined region (see FIGS. 6A and 6B, for example) of both sides of the sheets (except the front side and the back side) of a sheet bundle, which is produced in the bonding process.

Note that the fixing apparatus 6 may have a system other than the heating film system. For example, the fixing apparatus 6 may use a rigid fixing roller in place of the fixing film 6*a*, and cause a rotary member pair constituted by the fixing roller and the pressing roller, to nip and convey a sheet. In addition, the heating portion is not limited to the ceramic heater. For example, the heating portion may use a halogen lamp that generates radiant heat, or a coil (i.e., a magnetic-field generating portion) that generates the alternating magnetic field for causing a conductive layer of the fixing film or the fixing roller to generate heat through induction heating. In addition, in the heating film system, instead of the configuration in which the heater 6*b* directly slides on the inner circumferential surface of the fixing film 6*a*, a sheet-like or thin plate-like member having high thermal conductivity may be interposed between the heater 6*b* and the fixing film 6*a*.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075405, filed on Apr. 28, 2022, which is hereby incorporated by reference herein in its entirety.

What is claimed is:

1. An image forming apparatus comprising:

an electrophotographic image forming portion including (1) a scanner configured to emit light, (2) a plurality of process cartridges including a first process cartridge containing powder adhesive and one or more second process cartridges containing printing toner, and (3) a transfer unit including a transfer belt and a transfer roller, the electrophotographic image forming portion being configured to form an image on a sheet by using the printing toner and apply the powder adhesive onto the sheet;

a fixing device including (1) a tubular fixing film configured to rotate, (2) a fixing heater disposed in an internal space of the tubular fixing film and configured to be in contact with an inner surface of the tubular fixing film and to heat the tubular fixing film, and (3) a pressing roller that is configured to form a nip portion between the tubular fixing film and the pressing roller, the fixing device being configured to perform a fixing process in which the fixing device fixes the image and the powder adhesive to the sheet by heating and pressing the sheet while nipping and conveying the sheet in the nip portion;

a stacker on which a plurality of sheets that have passed through the fixing device are stacked;

a longitudinal-alignment reference plate;

a semicircular roller configured to move each of the plurality of sheets toward the longitudinal-alignment reference plate, to align the plurality of sheets stacked on the stacker in a longitudinal direction;

a lateral-alignment jogger configured to move in a lateral direction to align the plurality of sheets stacked on the stacker in the lateral direction, the lateral direction being orthogonal to the longitudinal direction; and a bonding device configured to perform a bonding process in which the bonding device bonds the plurality of sheets to each other with the powder adhesive, the bonding device including (1) a heating plate configured to move in a thickness direction of the plurality of sheets stacked on the stacker, (2) a pressing plate configured to face the heating plate in the thickness direction and support end portions of the plurality of sheets stacked on the stacker, (3) a bonding heater disposed on an opposite side from the pressing plate with respect to the heating plate in the thickness direction and arranged in contact with the heating plate, and (4) a pressing lever configured to move the bonding heater and the heating plate toward the pressing plate in the thickness direction, wherein the heating plate is configured to be brought into contact with one of the plurality of sheets in the bonding process, wherein the heating plate has a plate shape elongated in the longitudinal direction and includes a single protruding portion protruding in the thickness direction and elongated in the longitudinal direction, wherein, when viewed in the longitudinal direction, the protruding portion includes a flat portion and curved portions formed on both sides of the flat portion, wherein a pressed region, in which the sheet is pressed by the heating plate in the bonding process, is elongated in the longitudinal direction and has a width in the lateral direction that is greater than a width of the flat portion and that is less than a width of the nip portion of the fixing device in a sheet conveyance direction at the nip portion, wherein a width of an application region onto which the powder adhesive is applied is greater than the width of the pressed region when viewed in the longitudinal direction, wherein the powder adhesive is applied in an amount of 0.55 $mg/cm^2$, wherein P1 is equal to or higher than 0.1 MPa and equal to or lower than 0.2 MPa, P2 is equal to or higher than 0.3 MPa and equal to or lower than 0.4 MPa, and $P1<P2$ is satisfied, where P1 (MPa) is a peak value of pressure received by the sheet in the fixing process, and P2 (MPa) is a peak value of pressure received by the sheet in the bonding process, wherein a total pressure applied to the sheet from the heating plate in the bonding process is larger than a total pressure applied to the sheet in the nip portion between the tubular fixing film and the pressing roller in the fixing process, and wherein a surface temperature of the tubular fixing film in the fixing process is lower than a surface temperature of the heating plate in the bonding process, and the surface temperature of the heating plate in the bonding process is equal to or lower than 200° C.

2. The image forming apparatus according to claim 1, wherein the image forming apparatus is configured such that $G1<G2$ is satisfied, where G1 (Pa) is a storage modulus of the powder adhesive in the fixing process, and G2 (Pa) is a storage modulus of the powder adhesive in the bonding process.

3. The image forming apparatus according to claim 1, wherein the bonding device is configured to bond three or more sheets together by performing one round of the bonding process.

4. The image forming apparatus according to claim 3, wherein if a first sheet is the most separated sheet from the heating plate in the three or more sheets that are bonded together in the one round of the bonding process, and a second sheet is a sheet in the three or more sheets that is bonded to the first sheet with a layer of the powder adhesive, a peak temperature of the layer of the powder adhesive in the bonding process is lower than a peak temperature of the layer of the powder adhesive in the fixing process.

5. The image forming apparatus according to claim 1, wherein the pressed region has a shape in which a length of the pressed region in the longitudinal direction is larger than the width of the pressed region in the lateral direction, and wherein the longitudinal direction is a direction along a first edge of the sheet, and the lateral direction is a direction along a second edge of the sheet that intersects with the first edge.

6. The image forming apparatus according to claim 1, wherein an area of the pressed region is smaller than an area of a region in which the sheet is pressed in the nip portion.

7. The image forming apparatus according to claim 1, wherein the longitudinal direction of the heating plate is parallel to one side of a sheet.

8. The image forming apparatus according to claim 1, wherein the heating plate is formed of aluminum, wherein the pressing plate is made of silicone rubber and has a thickness of 2.0 mm, wherein a total pressure applied in the fixing process is 25 kgf, wherein a total pressure applied in the bonding process is 30 kgf, wherein P1 is 0.2 MPa, wherein P2 is 0.3 MPa, wherein a surface temperature of the tubular fixing film in the fixing process is 175° C., and wherein a surface temperature of the heating plate in the bonding process is 200° C.

9. The image forming apparatus according to claim 8, wherein when five sheets are bonded together in the one round of the bonding process, a temperature of the powder adhesive between a lowermost one of the five sheets and a sheet stacked directly thereon is equal to or higher than 80° C.

10. The image forming apparatus according to claim 9, wherein the powder adhesive has a storage modulus of 2.2×104 Pa at 100° C. and 3.2×105 Pa at 80° C.

11. The image forming apparatus according to claim 10, wherein the flat portion has a width of 1.0 mm, and wherein each of the curved portions has a radius of curvature of 1.5 mm.

12. The image forming apparatus according to claim 11, wherein the width of the pressed region in the lateral direction is 2.0 mm, wherein the width of the nip portion in the sheet conveyance direction is 9.0 mm, wherein the width of the application region in the lateral direction is 4.0 mm, and wherein the heating plate has a length of 300 mm in the longitudinal direction.

* * * * *